(12) United States Patent
Lozano

(10) Patent No.: US 8,488,143 B2
(45) Date of Patent: Jul. 16, 2013

(54) METHOD AND APPARATUS FOR DETECTING PRINTER INTERNET PROTOCOL ADDRESSES

(75) Inventor: Rosa Aurora Lozano, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2268 days.

(21) Appl. No.: 10/377,438

(22) Filed: Feb. 28, 2003

(65) Prior Publication Data

US 2004/0030810 A1 Feb. 12, 2004

Related U.S. Application Data

(63) Continuation-in-part of application No. 10/213,986, filed on Aug. 7, 2002, now Pat. No. 7,168,003.

(51) Int. Cl.
*G06F 15/177* (2006.01)

(52) U.S. Cl.
USPC ........... 358/1.15; 709/221; 709/217; 709/219

(58) Field of Classification Search
USPC ...... 358/1.15, 1.13, 1.14, 1.1–1.9, 1.11–1.18; 709/221, 217, 219; 713/330; 714/18
See application file for complete search history.

(56) References Cited

U.S. PATENT DOCUMENTS

| | | | | |
|---|---|---|---|---|
| 5,680,625 A | * | 10/1997 | Sekine et al. | 713/330 |
| 5,692,111 A | * | 11/1997 | Marbry et al. | 358/1.15 |
| 5,724,510 A | * | 3/1998 | Arndt et al. | 709/220 |
| 5,790,548 A | * | 8/1998 | Sistanizadeh et al. | 370/401 |
| 6,021,429 A | * | 2/2000 | Danknick | 709/208 |
| 6,029,238 A | * | 2/2000 | Furukawa | 712/1 |
| 6,115,132 A | * | 9/2000 | Nakatsuma et al. | 358/1.14 |
| 6,424,424 B1 | * | 7/2002 | Lomas et al. | 358/1.14 |
| 6,654,794 B1 | * | 11/2003 | French | 709/217 |
| 6,711,623 B1 | * | 3/2004 | Furukawa et al. | 709/249 |
| 6,920,506 B2 | * | 7/2005 | Barnard et al. | 709/245 |
| 7,016,060 B1 | * | 3/2006 | Carney et al. | 358/1.15 |
| 7,143,150 B1 | * | 11/2006 | Nuggehalli | 709/221 |
| 7,187,461 B2 | * | 3/2007 | Schlonski et al. | 358/1.15 |

(Continued)

OTHER PUBLICATIONS

"Hostname Resolution", by Andrea Pellizzon, published on Oct. 16, 1995 http://www.dmsa.unipd.it/andreap/nag/node35.html.*

(Continued)

*Primary Examiner* — Benny Q Tieu
*Assistant Examiner* — Lennin Rodriguezgonzalez

(57) ABSTRACT

An automated method of detecting the internet protocol (IP) address of a network printer that is in communication with a computer having a registry permits the printer to be tested in a way that bypasses any print driver software. The test thus determines whether the printer is operative and communicating with the computer, and the test is unaffected by possible defects in the print driver software. A list of printers which the registry indicates have been installed on the computer is first generated, this list including the network printer. One or more vectors are then generated which contain any IP or URL addresses, port names, or printer names that the registry associates with the network printer, its port, its port monitor, or its server. The internet protocol (IP) address of the network printer is then retrieved either directly from these vectors, if it can be found there; or it is retrieved from a domain name server or its equivalent in response to submitting to the server all or a part of the printer's name, its port name, or its URL.

18 Claims, 12 Drawing Sheets

U.S. PATENT DOCUMENTS

2002/0041394 A1* 4/2002 Aoki ............................ 358/1.15
2003/0231329 A1* 12/2003 Edmonds et al. ............ 358/1.13
2004/0010567 A1* 1/2004 Moyer et al. ................. 709/219
2004/0019671 A1* 1/2004 Metz ............................ 709/223
2004/0070779 A1* 4/2004 Ferlitsch ..................... 358/1.13

OTHER PUBLICATIONS

"Network Resource Access", Windows 200, published on Mar. 2000 http://www.microsoft.com/technet/prodtechnol/windows2000serv/reskit/cnet/cnad_arc_hnny.mspx?mfr=true.*

* cited by examiner

METHOD AND APPARATUS FOR DETECTING PRINTER INTERNET PROTOCOL ADDRESSES

REFERENCE TO RELATED APPLICATIONS

This application is a continuation in part of U.S. Utility patent application Ser. No. 10/213,986, entitled Method and Apparatus for Automating Printer and Printer Driver Diagnostics and Repair, filed on Aug. 7, 2002, now U.S. Pat. No. 7,168,003, the entirety of which is incorporated herein by reference.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to the automated maintenance and repair of computer peripherals, connected to computers by a network or port, and interfaced to the computers by means of driver software. In particular, the present invention relates to a method and apparatus for detecting the internet protocol (IP) address of a printer.

2. Description of the Related Art

When the personal computer was first introduced in the late 1970s and early 1980s, peripheral devices, such as printers, modems, scanners, and other such devices had to be custom designed to work with every type of PC. A printer, for example, required a hardware interface that would connect with the proprietary port of a given PC or else a bus card that would interface with the particular bus design of the PC. Then, in order for programs to be able to communicate with such peripheral devices, the manufacturer of the devices had to provide special driver software that would interface either with the computer's operating system or else with particular programs.

By the 1990s, the situation had improved somewhat with the introduction of fairly standardized hardware interfaces for peripheral devices. These include the standardized Ethernet connector, which can network to many peripherals; the standardized universal serial bus port (USB port) which can also support the addressing of many different peripherals; and the modern PC parallel port, which includes a number of protocols for bi-directional communications between a PC and a peripheral standardized as IEEE Standard 1284. These have displaced almost entirely earlier ports and protocols on both Apple and IBM PC compatible computers worldwide. In addition, modern operating systems on both Apple and IBM PC computers have standardized the interface between individual programs and peripheral device driver software to such an extent that peripheral drivers, while still having to be customized to particular printers, can now have a standard interface with the operating systems which, unfortunately, still come in different incompatible varieties.

Further advances have occurred in the abilities of operating systems to enumerate the specific identities of various peripherals connected to a computer. For example, through a protocol known as "Plug-and-Play," all of the modern Microsoft Windows operating systems, starting with version 95, are now able to interrogate their various buses and portals to determine what peripheral devices are connected to a computer. Peripheral devices have also been designed to respond to such enumeration requests by not only identifying themselves, but also by identifying in some manner the driver software which they require, such that operating systems may then prompt the user to find and present the appropriate driver software for installation as part of the operating system to support the operation of each such peripheral.

All of this standardization has promoted keen competition among peripheral product designers. They may equip their peripherals with one of a very small number of hardware interfaces, and then they need merely supply driver software appropriate to the printer and matching the specifics of the operating system installed on the computer. All of this has made it fairly simple to connect up to a new peripheral device, to install its driver, and to have it operating. In most cases, a new peripheral and its driver may be installed while a computer is operating, although it may need to be restarted to complete the driver installation.

In spite of all these advances, the vendors of peripherals still find that their users have a difficult time keeping them fully operative, and accordingly numerous telephone support requests are received from customers whose printers or other peripherals are not operating properly. Of these calls, only about 10 percent result from hardware-specific problems arising because a specific printer, for example, malfunctions mechanically or electrically. The remainder relate to various software problems—about ninety percent of all calls received.

In many cases, the user's problem may be identified by performing simple tests to see if a peripheral is installed, running, and communicating with the computer. Some problems may be solved by providing the user with a newer version of a driver or by reinstalling the existing driver. In other cases, the problem may be traced to a data spooler shutdown or to the user having filled up a hard disk upon which the spooler for a printer or other peripheral is located, thereby disabling the data spooler. While skilled technicians and even many computer technicians can resolve these types of problems with little assistance, many computer owners, users, and operators lack the technical expertise to figure out how to detect and solve such problems on their own.

With respect to printers, common printer problems often fall into one of the following scenarios:

The printer was never installed properly.

The printer is not able to communicate with the PC.

The computer is using an incorrect printer driver. Typically, the customer has installed the printer but has installed an incorrect driver, one not suited for the particular printer.

The computer is using an older, outdated version of the driver. The driver vendor may have a newer version of the driver, but the customer doesn't know about this and is not benefiting from fixes and enhancements to the software.

The customer is using an incorrect driver for the operating system installed on the computer. This typically occurs when a customer upgrades to a different operating system and only then discovers that the drivers installed on the computer no longer work with the newly installed operating system.

The computer is using a printer driver having a chosen human language that differs from that of the operating system and of the user. For example, an English language driver may be installed with an operating system that is set to work in Spanish for a Spanish speaking user.

The printer driver did not successfully install completely. For example, some of its dependent files are not installed upon the PC or are otherwise damaged or incorrect.

With the Windows operating systems NT, 2000, and XP, an error may have occurred in the operating system's print spooling services, and accordingly, print jobs cannot be "spooled" because those services are no longer running.

Finally, and related to above, if the print spooling is done on a local hard drive, the disk may be overly filled, and there may not be enough hard disk space for spooling to occur.

A number of automated services are known that can assist one in detecting and correcting some of these problems. Among others, Microsoft's "Windows Update" service is now able to detect the drivers associated with the Windows 2000 and XP operating systems, to check an external database of driver updates, and to present the user with a list of suggested updated versions of driver software for installation on a computer. But other than proposing upgrades for drivers, this service does not otherwise assist in diagnosing hardware and software problems originating in peripherals, their drivers, or their connections, and in exploring and presenting possible solutions.

For example, Hewlett-Packard has a support service called "HP Instant Support". When a customer wishes this form of support, the "client" computer belonging to the customer opens the Internet Browser and downloads a small browser plug-in developed by Hewlett-Packard. This plug-in allows customers to run various self-service tasks as well as assisted printer support tasks and diagnostics. Customers needing printer support can access the HP Instant Support service via the HP Instant Support home page or from the product support pages. Other forms of distributing the code include installation CDs or shipped with the computer or peripheral.

SUMMARY OF THE INVENTION

An example of the invention relates to a method of detecting the internet protocol (IP) address of a printer in communication with a computer. The method includes generating a list of printers that are installed on the computer. The method also includes generating a list of network port monitors installed on the computer. Further, the method includes determining the type of connection being used by each printer. Further still, the method includes retrieving the internet protocol (IP) address from a network connected printer.

DETAILED DESCRIPTION OF THE PREFERRED EMBODIMENTS

Figure 1:
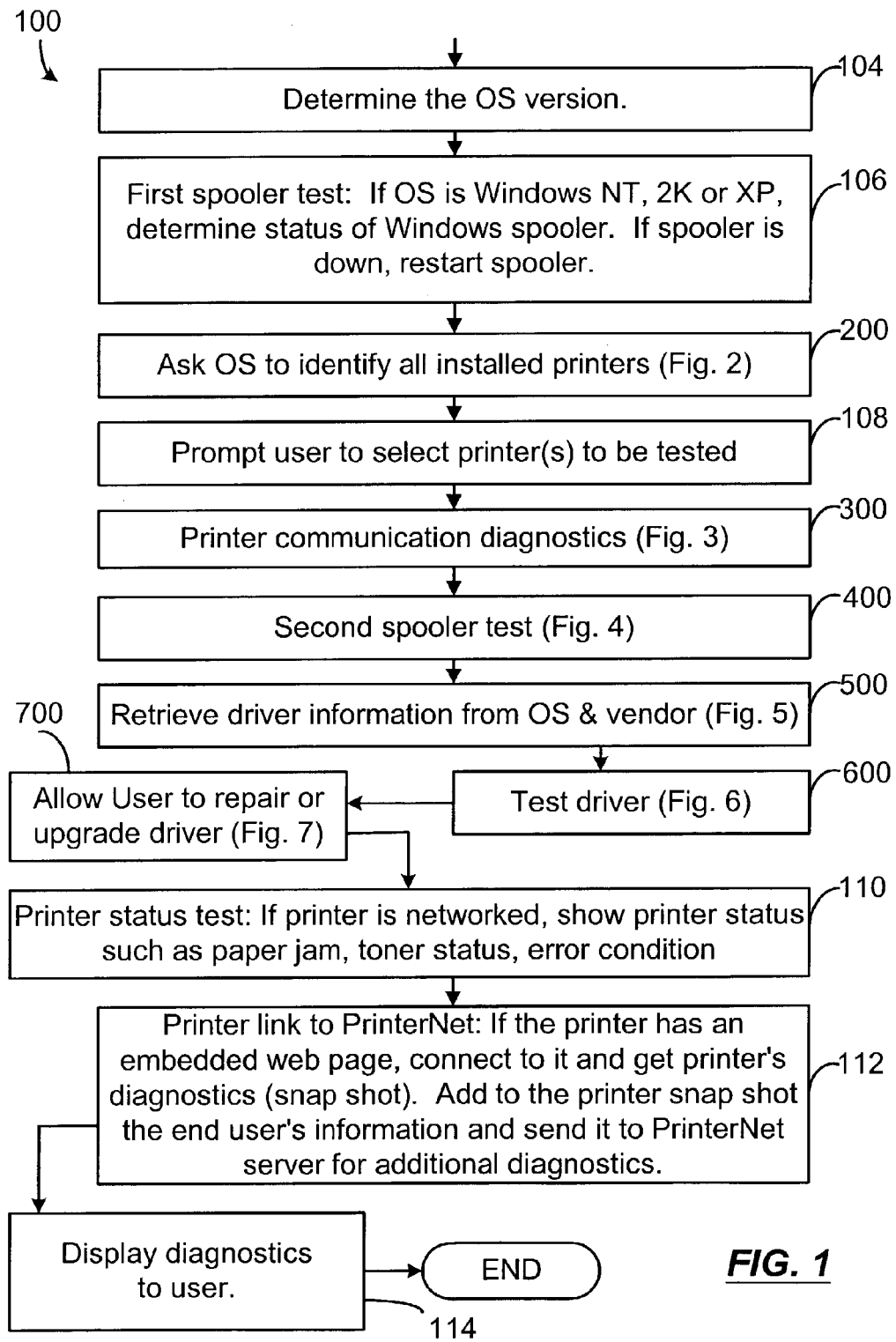
FIG. 1 presents a block diagram overview of a diagnostic and repair program in accordance with an embodiment of the present invention.

An embodiment of the present invention is designed to be implemented as part of a support service, such as but not limited to, "HP Instant Support" a service/product that is provided by a service provider (such as Hewlett Packard) that may be a printer or other peripheral device vendor, a computer vendor, an operating system vendor, to its customers. Such a service can also be offered by a third party.

According to an exemplary embodiment, the user first accesses hp.com product support pages and then selects the "HP Instant Support" links. However, other methods may be used to access the service. To place this exemplary embodiment of the present invention into operation, the user then clicks on "printer support" link.

In response to this selection, the host computer of the service provider (not shown) may cause a copy of HP's Instant Support browser plug-in to be downloaded to the user's computer. The browser plug-in contains a small C++ executable and corresponding libraries to be able to run the necessary printer diagnostics. All the code that is downloaded to the client computer is placed within a temporary directory from which all code and all intermediate files are stored. The key concept is that the customer never leaves the browser pages and printer support is delivered without the user switching to a separate application.

An exemplary embodiment of the present invention may also be available from HP's original Instant Support implementation using software that was developed by Motive Communications. Under this implementation, the user would download and install a software application written by Motive Communications called the "Tuner". The Tuner software would also download at least a first set of content material, including at least a displayable web page listing various types of instant support services that may be available.

In the Tuner implementation the user would click on a desktop icon that would have been installed during the initial download. The Tuner would then open a browser page listing all the services available including printer support.

The present invention may also be implemented without a Tuner program or a browser-plug in. A Java applet or other HTML/Java implementation may also be developed. Or even yet another embodiment, the program illustrated in FIG. 1. and the remaining figures can be delivered to a client computer without any "instant support" or other such accompanying service. It can be delivered pre-installed on a new computer, or it can be delivered on a CD, or it can be simply downloaded by a user wishing to gain the benefits of the invention.

In the first embodiment, a program 100 (FIG. 1) written in C++, is also downloaded as part of Instant Support browser plug-in. The downloaded C++ program 100 is responsible for the printer diagnostics, which are executed on demand from the customer and as result of user interface commands. This program conducts the necessary tests of hardware and software, causes the necessary pages of test result and user option information to be generated and displayed on the browser, gathers answers supplied by the user as well as data from the computer, calls for and receives peripheral driver data from a central host computer, and in general takes charge of the process of diagnosing peripherals and drivers and, where possible, instituting automatic repairs.

The operation of this program 100 is described in overview in FIG. 1. Referring now to FIG. 1, the program may be referred to as the diagnostic and repair program 100.

The program 100 begins at step 104 in FIG. 1 by calling out to the operating system to determine what version of operating system is running on the client computer. This first embodiment is designed to work with the following versions of the Windows operating system from Microsoft: Versions 95, 98, and ME, all of which are based on an older version of Windows code; and versions NT, 2000, and XP, all of which are based on a newer version of the Windows code. Windows NT, ME, 2000, and XP require a first type of peripheral device driver having a first driver interface to the operating system. Windows 95 and 98 require a different type of driver having a second driver interface to the operating system. Accordingly, drivers of the first type do not work with Windows 95 or 98, and drivers of the second type do not work with the other Windows versions. The same techniques can be applied to future versions of Windows or UNIX, provided appropriate drivers are supplied.

Having determined the operating system version, the program 100 now proceeds at step 106 to conduct a test of any spooler that is provided with the operating system to support the spooling of data for printer peripherals. Only the Windows operating system versions NT, 2000, and XP have built-in Windows spooler services. It can happen that such a Windows spooler service can encounter errors and shut itself down. If that has happened, the program 100 restarts the spooler and places it into proper operation before proceeding. At an appropriate point in time, the user may be presented with a cautionary message that the spooler was shut down and had to be restarted.

Figure 2:
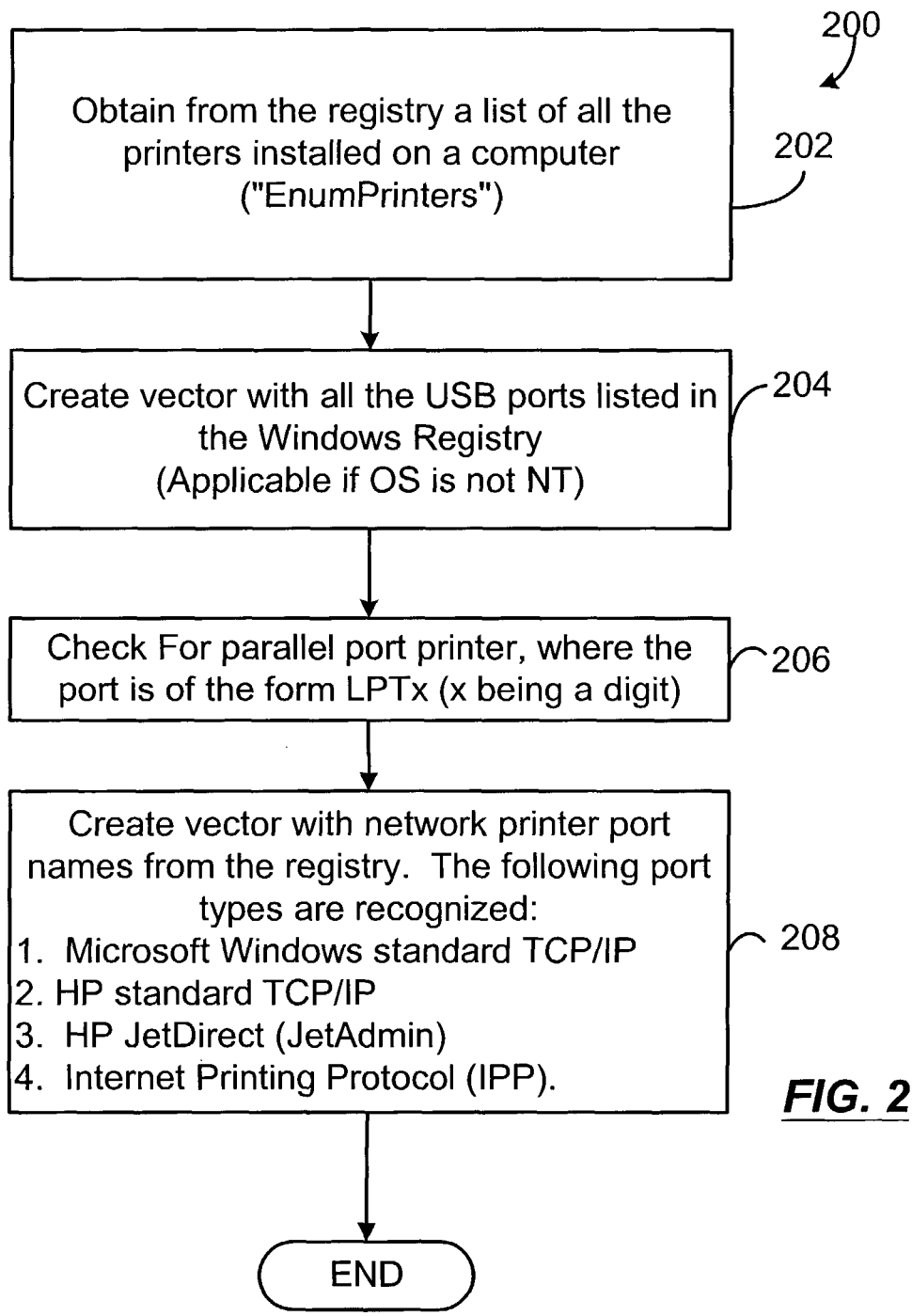
FIG. 2 presents a block diagram of a routine that asks the operating system to identify installed peripherals, in this case printers in accordance with an embodiment of the present invention.

Next, the program 100 calls upon the Windows registry to identify all of the various printers that have been attached to the computer (step 200—see FIG. 2). Then at step 108, this list of printers is presented to the user, and the user is asked to select which of the printers are to be diagnosed and, optionally, to have their drivers replaced or updated. This is done by displaying the list of printers to the user in an HTML browser page, with either check marks beside the printers or else some other way provided by which the user may indicate which of the printers are to be diagnosed. The user may elect to have all of the printers, just one printer, or selected printers checked at this time.

It may turn out that a particular printer which the user wishes to have checked does not appear in this list. If that should happen, instructions can explain to the user that the operating system registry records indicate the particular printer was never properly installed upon the computer. Accordingly, the user must at that point turn off the program 100 and complete the installation steps for that printer. A variation of the program 100 can be designed to download at this point the printer installation instructions and programs, in essence assisting the user through the process of installing the printer and its driver.

After the user has selected the printer (or printers) to be diagnosed and possibly repaired, the program 100 continues at step 300 where it performs the printer communication diagnostic test. This diagnostic test is described in more detail in FIG. 3. Briefly summarized, the program 100 actually attempts to communicate with the printer or printers, seeking them out at the local hardware port or over the network, and reporting back whether or not the computer can actually access the printer and whether it responds.

Figure 4:
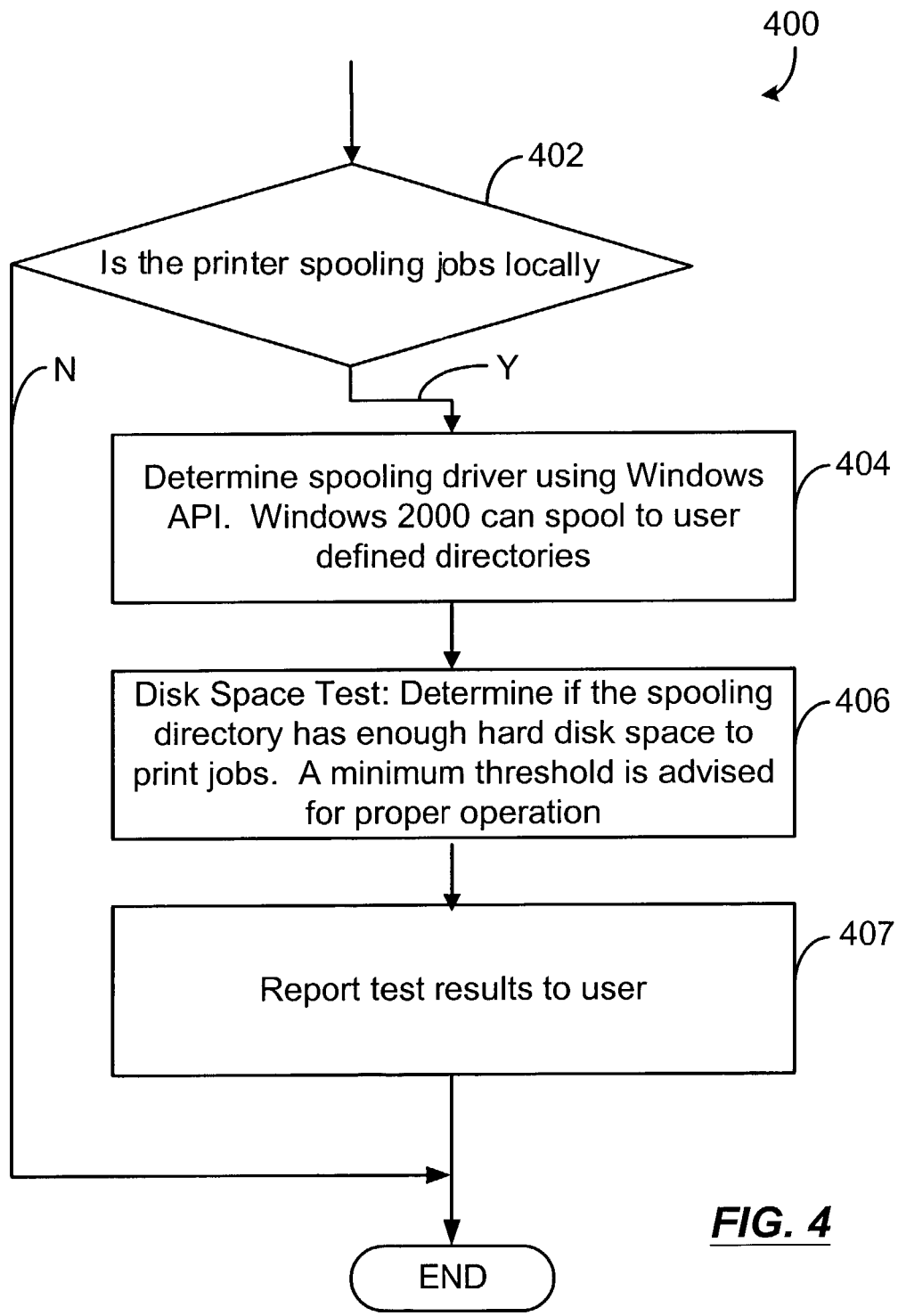
FIG. 4 presents a block diagram of a routine that tests the operating system spooler software and that also tests for drive overflow in accordance with an embodiment of the present invention.

Next, at step 400 the program 100 performs a second spooler test, the details of which are described in FIG. 4.

At step 500, the printer driver is identified, and the printer's type and other information are compared to information retrieved from a central server database which contains information about all of the possible drivers available for that particular type of printer. Then, at step 600, the driver software is tested, both to insure that it is complete and properly installed and also to check such things as the version, its compatibility with the operating system, and whether it is properly characterized as to its language to match the language of the user as indicated by the operating system.

After completion of these tests, at step 700 (FIG. 7) the user is notified of what has been found. And if there is any problem with the printer driver, the user is given the option to repair or upgrade the driver.

At step 110, and on the assumption that the communication test in step 300 succeeded, the actual status of the printer is checked out. This test reveals error conditions such as paper jams, low toner, and other simple hardware-related error conditions that may be causing a printer not to perform properly and that a user typically can correct.

At step 112, if the printer is a sophisticated and modern one having a built-in, embedded web page or series of web pages, then the program 100 connects with the printer and obtains a web page presenting a snapshot of the printer's actual diagnostics. This snapshot may be appended to the end of the information gathered during the previous tests. Information may also be sent on to a PrinterNet server, where additional diagnostics may be performed and results returned indicating the condition of this particular printer. This type of testing can be much more sophisticated. Finally, at step 114, the accumulated diagnostics are displayed to the user. These can include, for example, the results of: the first spooler test (step 106); the printer communication diagnostics test (step 300—see FIG. 3); the second spooler test (step 400, particularly step 407—see FIG. 4); the driver tests (step 600, particularly steps 604, 614, and 616—seeF*ig*. 6); as well as any report of driver repair and upgrade options (step 700, particularly step 718—see FIG. 7). (Many of these steps are described in the paragraphs which follow.)

Figure 7:
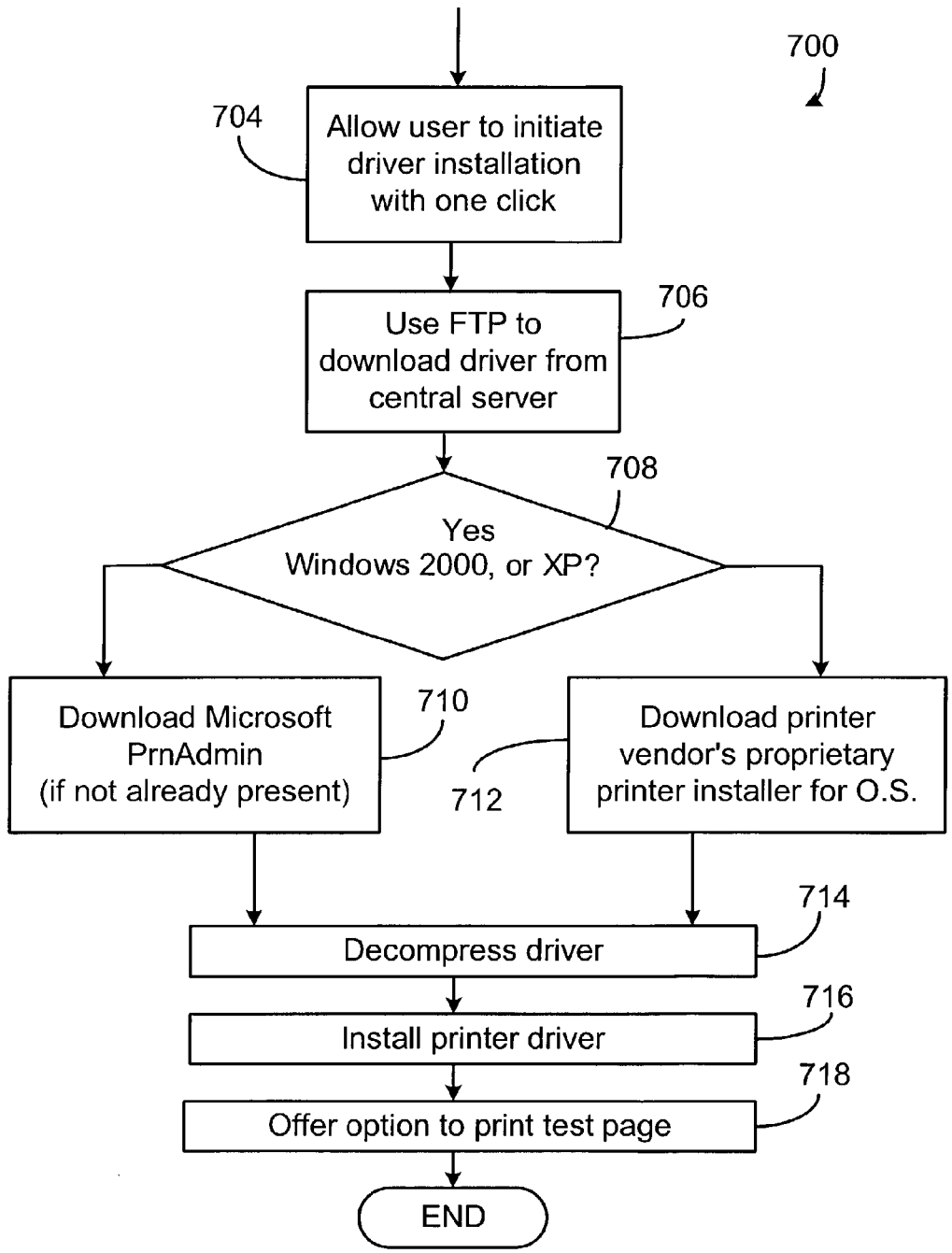
FIG. 7 presents a block diagram of a routine that allows a user to repair or upgrade driver software in accordance with an embodiment of the present invention.

If the user elects to download and install a new driver, then at step 700, the program 100 proceeds to do so, proceeding as indicated in FIG. 7.

Figure 11:
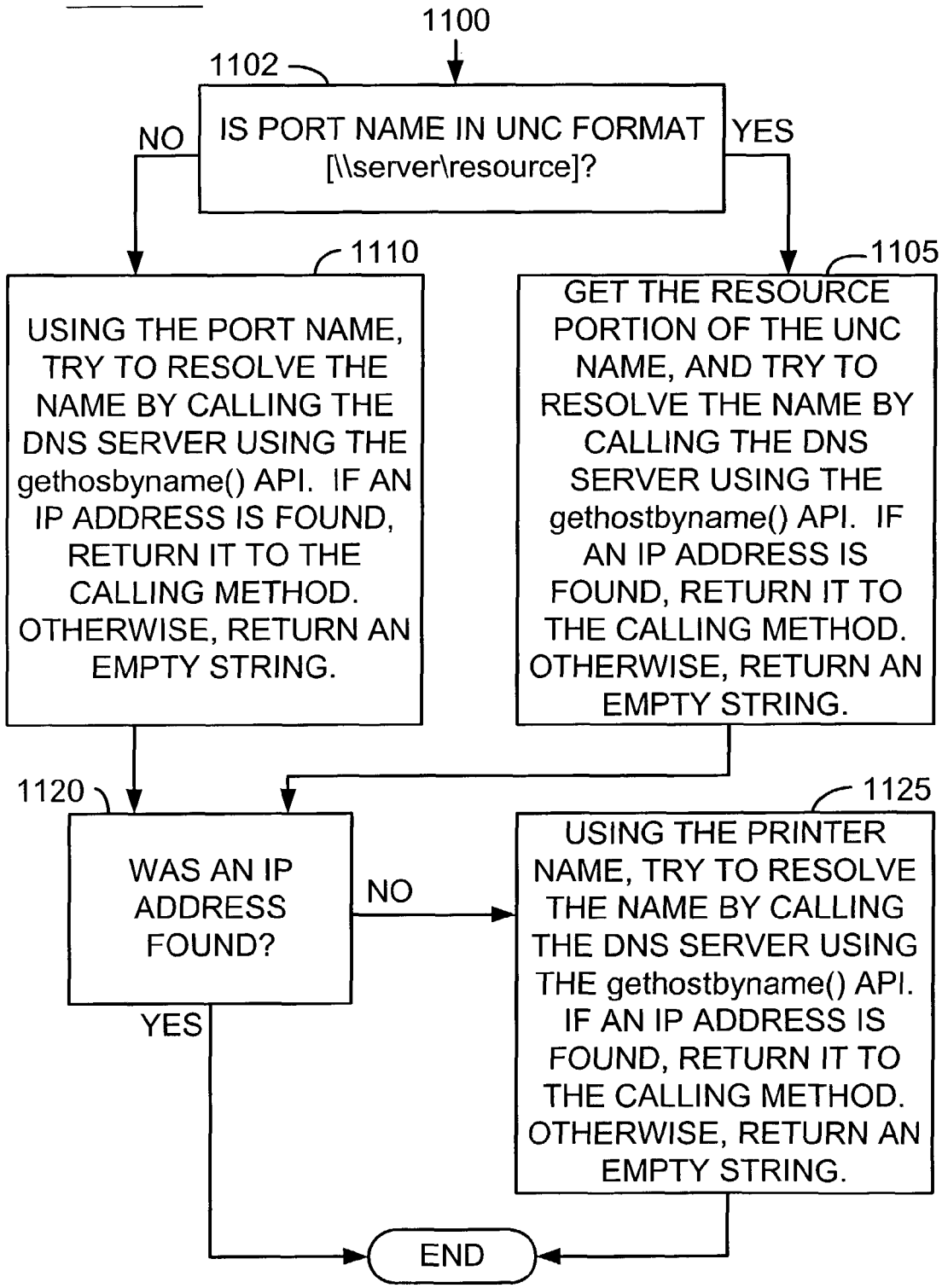
FIG. 11 presents a block diagram of a routine for discovering the IP address of a printer.
Figure 12:
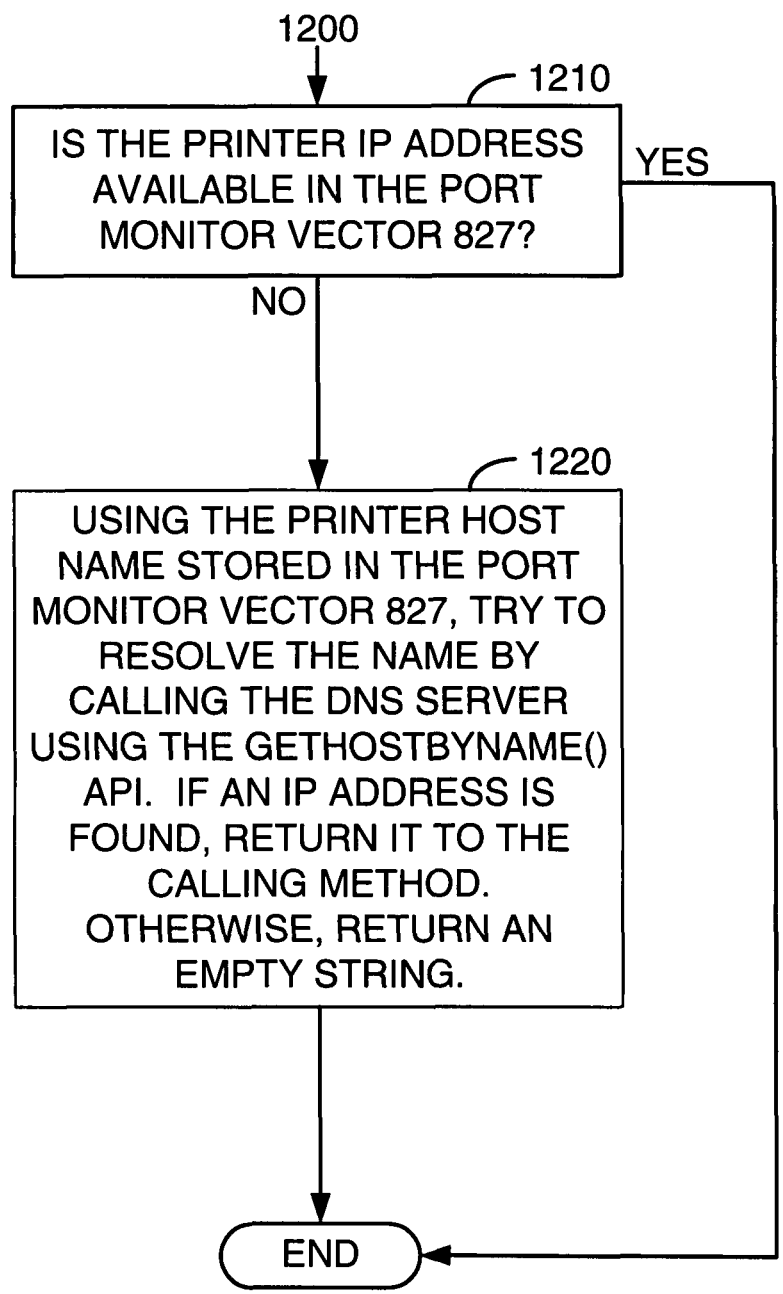
FIG. 12 presents a block diagram of a routine for discovering the IP address of a printer.

Referring now to the remaining figures, FIG. 2 presents at 200 the routines which ask the operating system to identify all installed printers and identify their addresses for testing. All printers have names and also port names. Parallel port printers have port names of the form "LPTx", where "x" is a digit. USB printers are registered as such on the computer. Peer to peer networked printers have a "port monitor" which is software that routes print jobs to the network printer at a particular TCP/IP port (or socket) IP address and port number, usually the port or socket number 9100. "Client/Server" printers, accessed through a print server, may have a port monitor; but if they do not, then the port name may be of the "universal naming convention" ("UNC") form "\\<server_name>\<printer_name>". Either the "<printer_name>" portion of the port name or the printer's actual name may be registered with a domain name server, which can be prompted to supply an IP address for such a printer. The "printer name" portion of such a UNC port name may also be called the "resource portion" of the port name. Thus, step 1105 in FIG. 11 speaks of getting the "resource portion of the UNC name."

First, at step 202, an API (application programmer's interface) call is made to retrieve all printer information from the Windows registry, where all installed printers are registered during their installation process. This call to identify all the printers is "EnumPrinters," a call which returns information concerning every printer installed on a given computer, including each printer's assigned name and assigned port name.

The remaining steps shown in FIG. 2 may be performed after step 106 (FIG. 1), where the user is asked to identify which printers are to be tested.

Next, at step 204, all USB port printers are identified. These printers were installed on the computer's USB port, so a record of each of them is contained in the USB registry. A first vector 305 is created that contains all of the USB or Universal Serial Bus printers that are listed in the Window's registry. However, this cannot be done if the operating system is Windows NT, which does not support USB port printers in this manner. The program "GetUSBPortMonitors ( )" which performs this USB printer enumeration task is set forth in Appendix B.

Then, at step 206, a check is made of printer port names for any parallel port printers, which are identified by having a port name in the form of "LPT1," "LPT2," "LPT3," or a like port name beginning with the letters "LPTx" (sometimes with a colon), a standard established in the early days of Microsoft's MS/DOS operating system.

Finally, at step 208, an attempt is made with reference to the registry to identify the remaining printers as network printers accessible over a local area network. First, a second vector 827, which may be called the port monitor vector 827, is created to enumerate any port monitors set up for network printers. This is accomplished by a registry call for all entries under HKEY_LOCAL_MACHINE\SYSTEM\CurrentControllerSet\Control \Print\Monitors On the assumption that the routine 200 is searching for Hewlett Packard network printers, in the registry four different types of port monitors are queried from the registry subdirectory identified above: First, Microsoft's Standard TCP/IP port monitor; secondly, Hewlett Packard's TCP/IP port monitor; thirdly, Hewlett Packard's Jet Admin port monitor; and finally, Internet Printing Protocol (IPP) port monitor. Other monitors can also be added in different embodiments, possibly including some supporting other brands of printers.

For each printer port monitor found under these recognized Port Monitor providers, the following data is retrieved and is added to the second port monitor vector 827: (1) IP address, (2) host name, and (3) SNMP community name. If the IP address of a printer is not available from the registry (step 310 in FIG. 3), then the Domain Name Server (DNS) is queried to check whether the host name can be resolved into an IP address (step 312). If all of this fails, then the user may be asked to provide an IP address (step 314).

If no monitor is found for a printer, then the printer's port name and printer name are examined to see if any of the names conforms with the UNC (universal naming convention) and is of the form "\\<server>\<host_name>". If the <host_name> corresponds to a UNC name formatted as shown, then the <host_name> portion is extracted and submitted to a domain name server to see if a corresponding IP address is available (step 312). If all of this fails, then the user may be asked to provide an IP address (step 314).

This task is complicated by the fact that one is dependant upon operating system registry data concerning these printers, and there are no definite standards concerning how printer monitors on a network should be registered—some installation programs make different entries into the registry than do others, and some may also place the data into different locations.

This embodiment of the invention is designed to recognize four different types of registry entries. These must be identified, distinguished from each other, and then accessed in different ways to determine the network addresses of the installed network printers.

First, if the network printer was installed using the Microsoft TCP/IP port monitor, the pertinent part of the monitor data will be placed within a folder labeled with the name of the port. That folder will be placed within another folder named "Ports". And the "Ports" folder will be enclosed within the "Standard TCP/IP Port" folder. For each new port added to the computer, a like subfolder named with the port name is created that contains the port configuration data.

Microsoft "Add Printer" utility present on all Windows operating systems is a Microsoft installer, and it usually uses the Standard TCP/IP port monitor during the installation of network printers.

Second, if a printer was installed using a Hewlett Packard "TCP/IP Port Monitor" installer that comes with many Hewlett Packard printers, then essentially this same protocol is followed, with one change: ports added to the computer by Hewlett-Packard's installer are contained within a "HP TCP/IP Port Monitor" folder within the registry's "Monitors" subfolder.

Third, if the printer was installed using Hewlett Packard's JetAdmin software, which provides its own port monitor, the JetAdmin port installation creates a subfolder within the "Monitors" subfolder named "HP JetDirect Port" that contains a "Ports" folder which contains information for each new port added to the computer, as in the above arrangements. Each printer port is assigned a default name created by JetAdmin, such as "NPI04AD5E".

In the case of the JetAdmin monitor, the port configuration data for each printer is different. The data may identify, among other things, the printer's IP address, but not as an isolated value, as with the monitors described above. The IP address, if present, appears within a string named "HPNetowrkPrinterID". But the address within this string is a TCP/IP address only if the string is of the form "TCP/IP=<address>" This port monitor may support another networking protocol, such as IPX, and in that case the string would be of the form "IPX=<address>", and the address would not be an IP address usable by the present embodiment of the invention to find and test the printer. Accordingly, all strings beginning with some prefix other than "TCP/IP=" are ignored by this embodiment of the invention. A different embodiment designed to work with several different networking protocols might contact network printers using such other network protocols guided by such information.

A fourth class of installer is an industry standard Internet printing Protocol (IPP) installer. This type of installer is typically built into a printer-generated web page. The user or system administrator, knowing the printer's IP address, used a browser to call up this web page, and the web page ran a Java applet that installed the printer and its driver on the computer. In this case, the port monitor is found within a folder called the "Internet Printer Connection Port". For each new port added using this protocol, a key is added to the registry called "URL" which contains the URL of the printer. This can be translated into an IP address by the domain name server.

Figure 3:
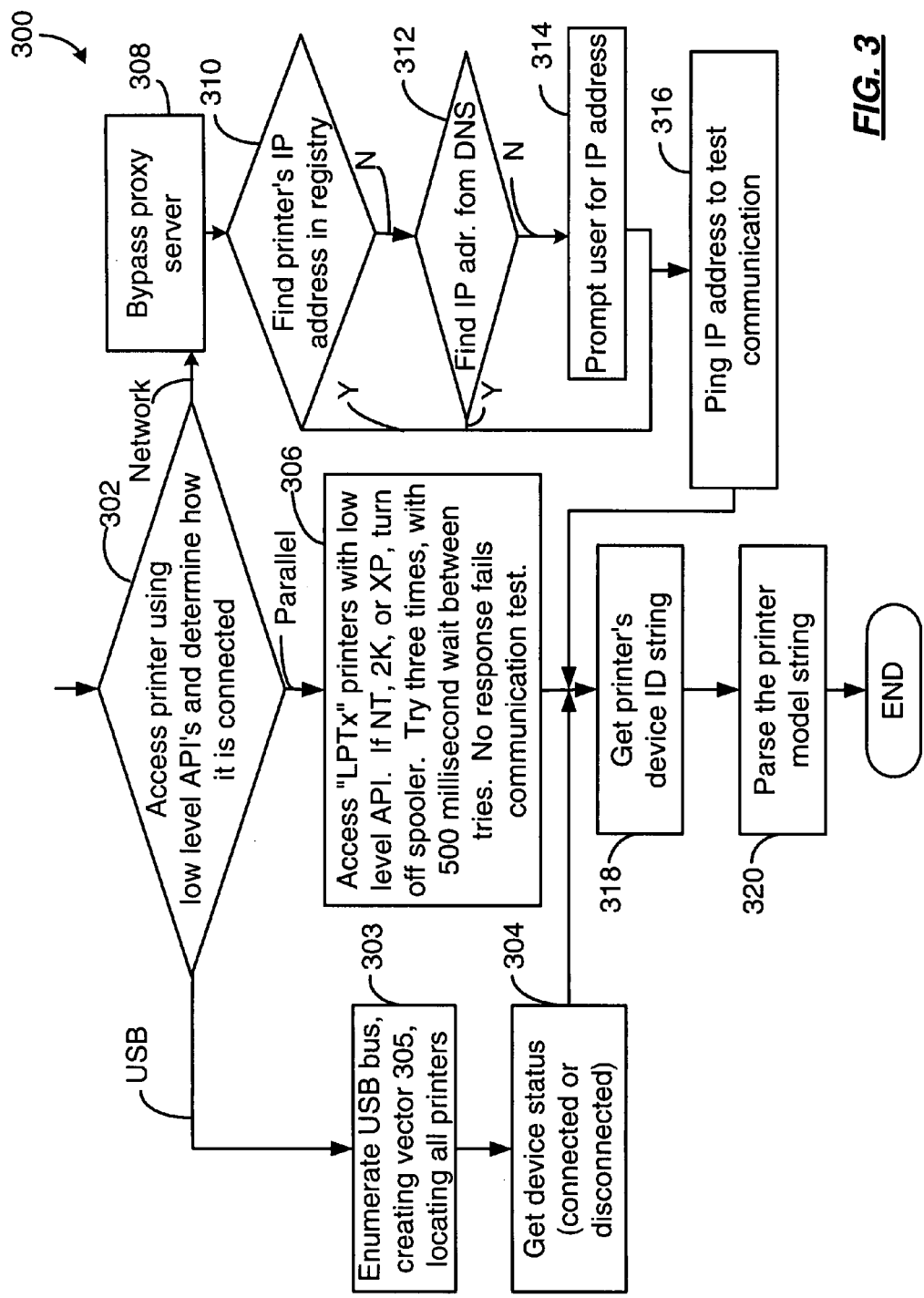
FIG. 3 presents a block diagram of a routine that tests the communications between a printer and the operating system of a computer in accordance with an embodiment of the present invention.

FIG. 3 presents the routine that performs printer communication diagnostics tests after a user has selected one or more printers to be tested at step 108 in FIG. 1. (Some steps in FIG. 3 were described in conjunction with the description of FIG. 2 presented above.)

The routine 300, at step 302, determines whether each printer to be tested is a network or TCP/IP printer, a USB printer, or a parallel port printer in the manner explained above. Then the routine uses low-level application programmer interface calls into Windows to access the printer and to test it.

If the printer is listed in the first vector 305 of USB bus printers, then at step 303 the program 100 calls for a complete USB enumeration of all the devices connected or attached to any and all of the USB buses associated with the computer. This enumeration request should locate each USB printer which the registry indicated was located on the USB bus. If it fails to do so, then this signals the presence of some form of hardware discontinuity, such as the printer not being turned on, not being plugged in, or not being connected to the computer. It may also signal a defective USB cable or plug or interface. This information is noted for later presentation to the user. If a printer is located, then the enumeration command reports the status of the printer and its device ID string at step 304. The "status" is "connected" or "disconnected."

In the case of one or more parallel port printers, any and all parallel port printer devices which the registry indicates are attached to printers are accessed (step 306) with a low-level application programmer interface call (DeviceIOControl). If there is no response to this call, the call is repeated up to two more times after half second delays. If there is still no response, then again it is assumed that the parallel port printer is either inoperative or not connected properly to the printer's parallel port, or the cable or the parallel port itself may be defective. If the printer does respond, then its device ID string is recovered.

In the case of a network printer, first, to speed up considerably communications with such printers, any proxy server is bypassed (step 308) so that messages are sent to printers on the inside of the company's firewall. At step 310, an attempt is made to detect through the registry the printer's IP address (as explained above). If an IP address is not available, then an attempt can be made to obtain an IP address from the domain name server, as was explained above (step 312). If all of these efforts are unsuccessful, then the user may be prompted to provide an IP address for the printer (step 314). In any case, the physical connection of the printer to the computer is tested out at step 316 by simply "pinging" the printer's IP address in the standard manner, to see if the ping address is echoed back by the printer to indicate full communication is available.

In any event, the device ID string (the 1EEE-1284 parallel port identification string is used in this embodiment for all printers, no matter what connection they use) is obtained at step 318, and it is parsed to locate the printer model string at step 320. This string is later used to identify the printer when searching for its drivers.

Note that the printer's active driver is bypassed and is not involved in this test of printer communications.

With reference to FIG. 4, the second printer spooling test is set forth. First, at step 402, a check is made to see that the spooling is being done locally, on the client computer being tested, rather than remotely on some server, as is done in many networked environments. If there is no print spooling, or it is not being done locally, then the routine 400 terminates. Otherwise, the Windows application programmer interface is used to determine the spooling driver and where the print spooling is being done and on what hard drive (step 404). In the case of Windows 2000 and 2000 XP. Having located the spooler directory, at step 406 a disk space test is carried out to determine if there is enough room in the spooler drive to contain print jobs. A minimum threshold of space is advised for proper operation. If there is not sufficient room, typically due to the user placing too many files on that particular hard drive or volume, then a fault or defect indication is signaled. The result of this test is returned to the user at step 407 at an appropriate time.

Figure 5:
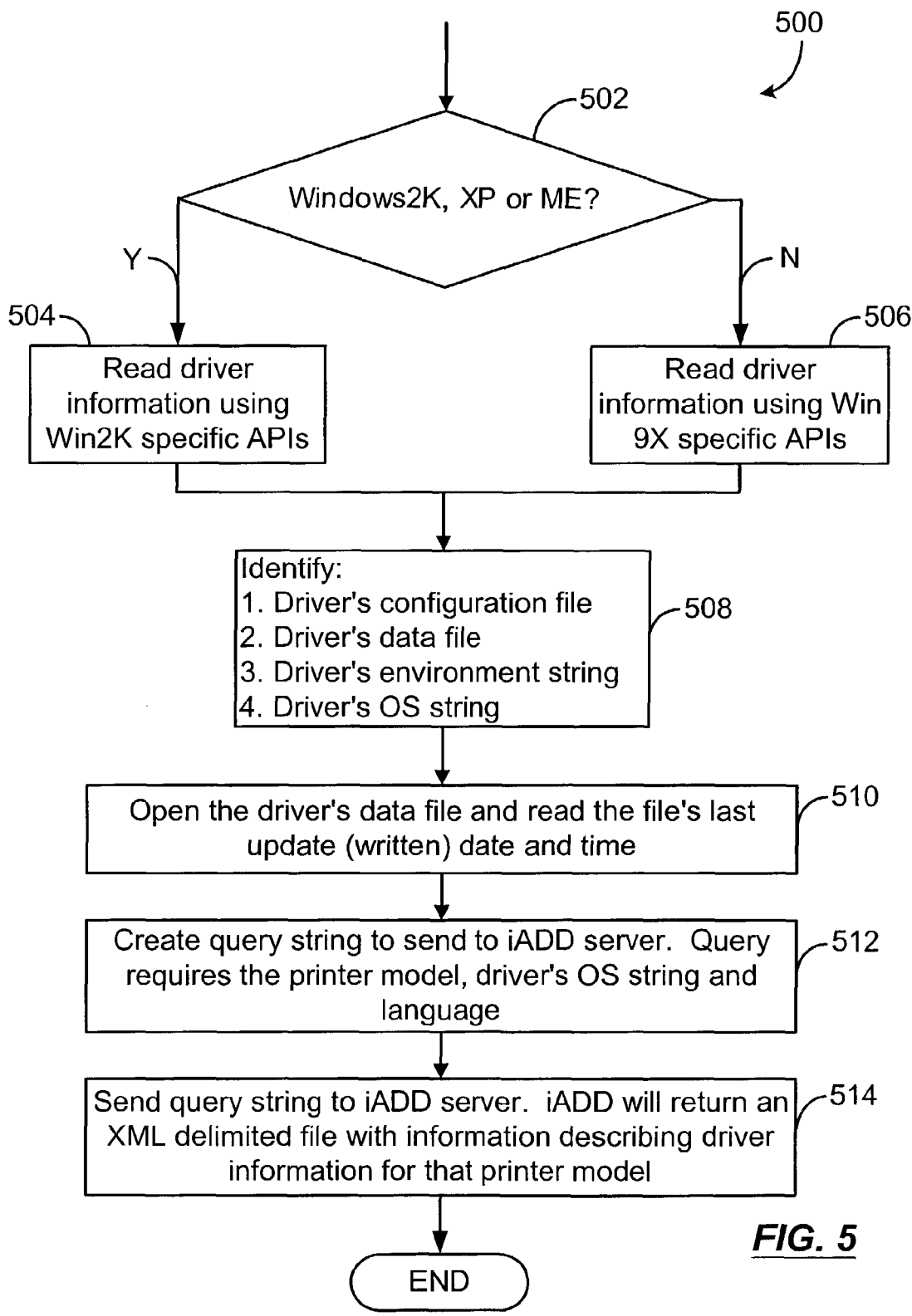
FIG. 5 presents a block diagram of a routine that retrieves driver information from the operating system as well as from a server maintained by a peripheral device vendor, a computer vendor, or other such party in accordance with an embodiment of the present invention.

In FIG. 5, the routine 500 retrieves information about the driver software both from the operating system and also from a server maintained by the printer vendor or some other provider. First, at step 502, a determination is made of which operating system version is in use. As noted above, printer drivers for Windows 95 and 98 are entirely different from printer drivers for Windows NT 2000, XP and ME; and even within these families of operating systems, a given driver may be certified for use with one operating system version and not with another.

A test is made at 502 as to which operating system is present on the computer. If Windows 95 or 98 is found, then at step 506 driver information is obtained using the specific application programmer interface calls for those versions of Windows. Otherwise, at step 504 the driver information is read using Windows 2000 A.P.I. calls. The information identified by these calls is indicated at step 508 to include information about the driver's configuration file, the driver's data file, the driver's environment string, and the driver's operating system string. In addition, at step 510, the driver's data file is opened, and the operating system is called upon to report the driver data file's last update date and time, the date when that file was last written to. At the same time, a check is made to insure that all the component files of the driver exist and are not of zero length. Any discrepancy is later reported to the user at step 704 in FIG. 7.

This is done because the manner of keeping track of versions for printer drivers has not been consistent over time. While other driver files may be shared, a driver's data file is typically unique to one printer and is not duplicated nor likely to have been overwritten. Accordingly, the creation date and time of the driver data file is used as a substitute version number.

Having identified the driver and its "last modification of the data file" version number, the program 100 creates a query string at step 512 which it sends to the printer vendor's (or other provider's) server. In the case of Hewlett Packard, this query string is directed to a data base named iADD installed on a server maintained by Hewlett Packard. The query is sent to the server in the form of an HTTP web page request directed to a server-based database, with parameters appended to the request that include the printer model (extracted from the 1EEE-1284device ID string), the operating system's identity, and the operating system's language (English, French, etc.) At step 514, this query string is sent to the iADD server. The iADD data base then returns an XML file formatted as is shown in Appendix A that contains information describing all of the drivers available for that particular printer model or type.

The information returned, as indicated in Appendix A, identifies all the drivers available for that particular printer model from the printer vendor, the dates when their data files were last written to (to serve as a substitute version number), the operating system they are designed to work with, and the language (English, French, etc.) that they are compatible with. Other information may also be included, as is indicated in Appendix A.

Figure 6:
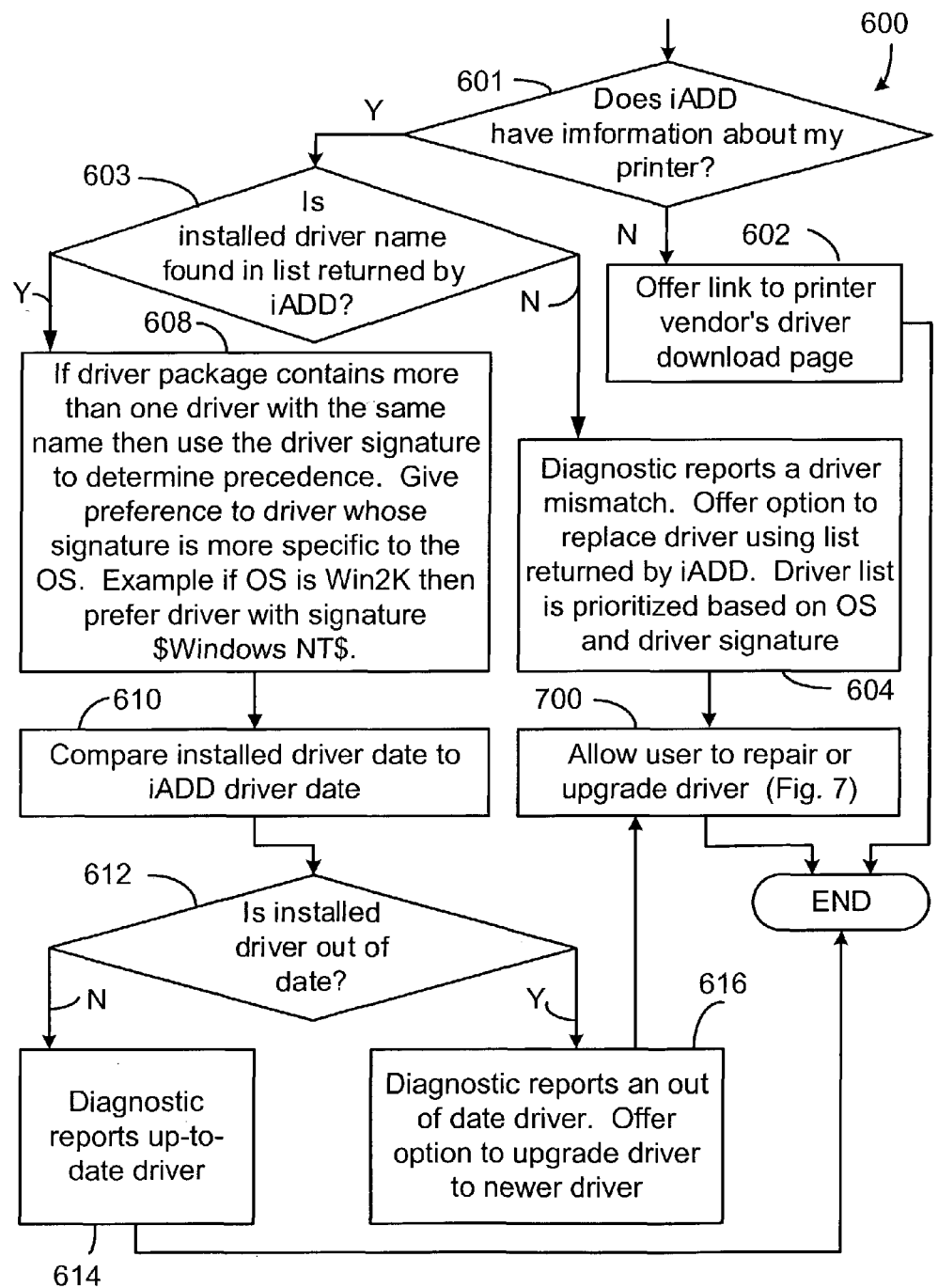
FIG. 6 presents a block diagram of a routine that tests driver software in accordance with an embodiment of the present invention.

FIG. 6 discloses the details of the driver test routine 600. This routine begins at step 601 by checking to see if any information about drivers for this particular model or type of printer was obtained from the vendor's iADD server database. If not, then at step 602, the program 100 finds and offers to the user a link to the printer vendor's "driver download" web page for that particular printer model or type, thereby permitting the user to select a driver manually and to complete the download process semi-manually by going to the vendor's web site, making a driver selection, downloading it, and then having it installed it in the usual manner.

If information about drivers for the printer model or type was found, then program control continues at step 603. At this step, the name of the driver installed on this computer is compared to the names of the drivers in the database for that printer. If this driver name does not appear in any of the database entries for this model or type of printer, then it is likely that an improper driver is installed, not one designed for this particular printer. It may also possibly be a "default" driver provided by the operating system which may be acceptable, but which may not have all of the desired capabilities nor support all of the available features of the printer. For example, the driver may not communicate with the printer bidirectionally. In any event, at step 604, a driver mismatch is reported, and at step 700 (FIG. 7) the user is offered the option of replacing the driver installed on the computer with one chosen from the list returned by the print vendor's database. The list of drivers is prioritized based upon the compatibility of the operating system or systems specified for the driver (the operating system compatibility is indicated by the driver's "signature") with the operating system installed upon the computer. For example, a Windows 2000 driver might be selected for use with Windows XP if no Windows XP driver was available, since the drivers for those two operating systems are generally considered to be compatible.

If the presently installed driver is found in the list, then program control branches from step 603 to step 608. At this step, if more than one driver exists for this printer, then the driver's operating system signatures are examined to determine their precedence. Preference is given to the driver whose operating system specification in the signature is more specific, or closer in compatibility, to the operating system installed on the computer. For example, if the operating system on the computer is Windows 2000, then a driver with a Windows NT signature would be preferred over drivers with signatures for Windows 95 or 98.

At step 610, the date of the data file associated with the installed driver is compared to the dates of the drivers selected from the vendor's database. At step 612, if the driver is not out of date but is current, then this fact is reported at step 614. Otherwise, at step 616, the diagnostics report an out-of-date driver and offer the user the option to upgrade to a newer driver. In this event, program control then continues at step 700 in FIG. 7 where the user is permitted to repair or upgrade the driver.

With reference to FIG. 7, at step 704, a report on the driver is presented to the user along with any options, as indicated in the routine 600 presented in FIG. 6. The user is then permitted to initiate the installation of a new driver with a single click of a mouse button.

If the user elects to install a new driver, then at step 706, The internet's standard FTP function (File Transfer Protocol) is used to download a driver from the vendor's central server. The driver's FTP internet address was included in the material returned from the vendor's iADD database in an XML data structure. (See Appendix A).

Having downloaded the driver, at step 708 it is necessary to download, or check for the presence of, suitable driver installation software. In the case of Windows XP or Windows 2000, installation software for the driver is included as part of the Microsoft operating system. A check is made to see if the Microsoft program PrnAdmin is present on the machine. If not present, then at step 710 this Microsoft program is downloaded. In the case of older versions of the Windows operating system, the vendor's proprietary printer installer for that operating system is downloaded at step 712, if it is not already present. Next, at step 714, the driver is decompressed. At step 716, the appropriate installer is called upon to install the printer driver into the operating system. And finally, at step 718, the user is invited to print a test page to insure that everything is working properly.

An objective of the peripheral diagnostic tools discussed above is to allow end-users to access a number of self-service diagnostics and if needed, to allow the customer to contact a technical support service via the Internet or over the phone. These support services require a level of automation and simplicity to allow the customer to achieve a reasonable level of success on their own without the help from a system administrator or technical support personnel.

The peripheral diagnostic tools are designed for addressing printer diagnostic and troubleshooting needs. They are targeted at the printers in the commercial space, which consists of mid-range to high-end laser printers connected to the network and to a much lesser degree connected to the parallel port of a PC.

A first printer network setup scenario involves the use of a PC that is dedicated to provide spooling and management services for a group of printers. In this scenario the PC shares the printers with other PCs in the network. Each client PC connects to the network printer via the print server PC in a client-server fashion. Client computers send any new print job to the server PC where the job gets spooled and then forwarded to the network printer for printing.

A second printer network scenario involves the connection from each client PC directly to the network printer in a peer-to-peer fashion. Client computers send any new print jobs directly to the printer. This scenario provides no centralized print management but has the advantage that the print job is sent only once on the network thus providing better network utilization.

In an exemplary embodiment, the goal of the printer diagnostics is to automate the diagnostic and troubleshooting of printers that are already installed on the end-users' PC and are connected to a network printer in a peer-to-peer or client-server fashion. Printers connected to the parallel port or USB port may also be supported. Regardless of the connectivity type the diagnostic tools will attempt to automatically gather as much information about the device with minimum user intervention.

In an exemplary embodiment, the printer diagnostics support the Microsoft Windows platform. Specifically it may cover the following operating system versions Windows 98, Windows ME, Windows NT, Windows 2000 and Windows XP. However, other operating system platforms may also be covered without departing from the scope of the claims.

A first logical step in a printer diagnostics algorithm is the automatic detection of the printer's internet protocol (IP)

address. Based upon the operating system and the specific installation tool used, an IP detection algorithm attempts to find this key piece of information, which allows the rest of the diagnostic application to communicate with the device and perform the necessary device diagnostics. The need for such algorithm is driven by the fact that most customers do not know the device's IP address or don't know how to obtain such information from the device.

The printer diagnostics software may be available from the Internet. Users are instructed to install a small browser plug-in or an Applet, which includes the printer diagnostic software, which is a small executable. The software has a small footprint to provide for a fast response time. Once the printer diagnostic application is downloaded on the PC, the first step is to create an inventory of all the printers that are installed on the computer. This can be done, for example, by calling the EnumPrinters( )Windows API (step 303 in FIG. 2). The resulting inventory consists of the printer name, driver name and port name used by the printer.

Once the list of printers is gathered, the customer is given the option to select one or more printers to be diagnosed (step 108 in FIG. 1). The user chooses the printers to be diagnosed by their name, which is how customers typically identify the printer during printing.

Upon selecting a printer for diagnostics, the software uses the printer name that was supplied and proceeds to call the Windows API OpenPrinter( ). This API provides a way for the application to inquire how the printer was installed on the computer. The information that is gathered is strictly from the operating system point of view. In other words, the printer may be installed and the user may have decided to use a printer driver, for example, a color LaserJet, but the actual physical device may not even support color. In some cases the printer may be configured on the computer but the physical device is not connected to the computer or the network. Accordingly, the second logical step in the printer diagnostic algorithm is to actually attempt to communicate with the physical printer device and gather the necessary diagnostics and parameters from it.

If the printer is connected to the network, the software makes use of SNMP calls to gather about 20 parameters from the printer that are of use in the troubleshooting session. Examples of these values are printer toner levels, error conditions, paper handling problems, etc. Some LaserJet printers even provide an embedded web server that can provide a great number of printer values. To be able to communicate with the printer, the software must know the printer's IP address.

The rest of this description focuses upon the details of an algorithm for automatically detecting the printer's IP address. The algorithm used is a best effort algorithm, so there may be situations in which the IP address cannot be determined, and the user must be prompted for the IP address.

The algorithm begins by enumerating the printer port monitors installed on the PC. The role of the port monitor is to handle the interface between the network low level protocols and the print subsystem in the PC.

Each of the port monitors is associated with a DLL or well known port name that allows the software to determine if the port corresponds to a network, parallel or USB port. In an exemplary embodiment, the algorithm recognizes the following network ports names: (1) Microsoft TCP/IP Port Monitor serviced by the tcpmon.dll. (2) The HP TCP/IP Port Monitor serviced by the hptcpmon.dll. (3) The HP Port Monitor (used by JetAdmin/Web JetAdmin) serviced by the hplocmon.dll. (4) The Microsoft LAN Manager Port Monitor. (5) The Microsoft Internet Port Monitor. (6) The HP Internet Port Monitor, serviced by the hpjippmn.dll. (7) The USB Port Monitor. (8) The Local monitors (Parallel, COM and IR). However, other ports may be reconfigured as well.

Each of the port monitors is associated with one or more printers. However, each printer is associated with only one instance of a port monitor. At the time the printer is installed, the end-user needs to specify if the printer is connected via USB, Parallel or Network port. The printer installation packages configure the appropriate printer port, and many of the configuration settings are stored in the Windows Registry. Unfortunately there are no port installation standards, and the operating system does not provide an API that can be used to query for printer values, such as the printer IP address in a uniform way. In some cases the printer IP address is readily available from the Windows registry. In some other cases it is not.

The IP address detection algorithm determines if the printer is installed to a parallel or USB port by comparing the printer port name against the port name standards. For parallel printers the port name associated with the printer is in the form "LPTx" where x is a digit. Therefore any printer that is using a port name such as LPT1 or LPT3 is connected via the parallel port. In the same manner, USB printers can be identified by comparing the printer's name against the list of USB port names that are registered with the computer. The list of USB port names is available from the Windows Registry.

Next, vectors 305, 827, and 927 are created that contain printer information. For example, three vectors may be created.

The vector 827 may contain information about the port monitors found under the following registry entry:
HKEY LOCAL MACHINE\SYSTEM\CurrentControllerSet\Control\Print\Monitors.

Port monitors installed under this Windows Registry and included in this vector 827 correspond to ports developed by Microsoft, Hewlett-Packard or other vendors. For example, Hewlett-Packard has developed a TCP/IP port monitor serviced by the hptcpmon.dll. Applications such as the HP Network Printer Installer Wizard install the port monitor DLL (if not already installed) and associate the network printer with the port monitor. Once the port monitor is installed it can also be used by Microsoft's Add Printer tool that is available from the operating system.

The vector 927 may be created with all the port monitors that are installed by client-server printers and that are managed by Microsoft LAN Manager printing. This information is found under the following registry entry:
HKEY LOCAL MACHINE\SOFTWARE\Microsoft\WindowsNT\CurrentVersion\Print\Providers\LanMan Print Services\Servers The print servers listed under the registry entry are created at the time the user configured a printer using the Add Printer tool from the operating system. Only Windows NT and above have this registry entry.

Figure 8:
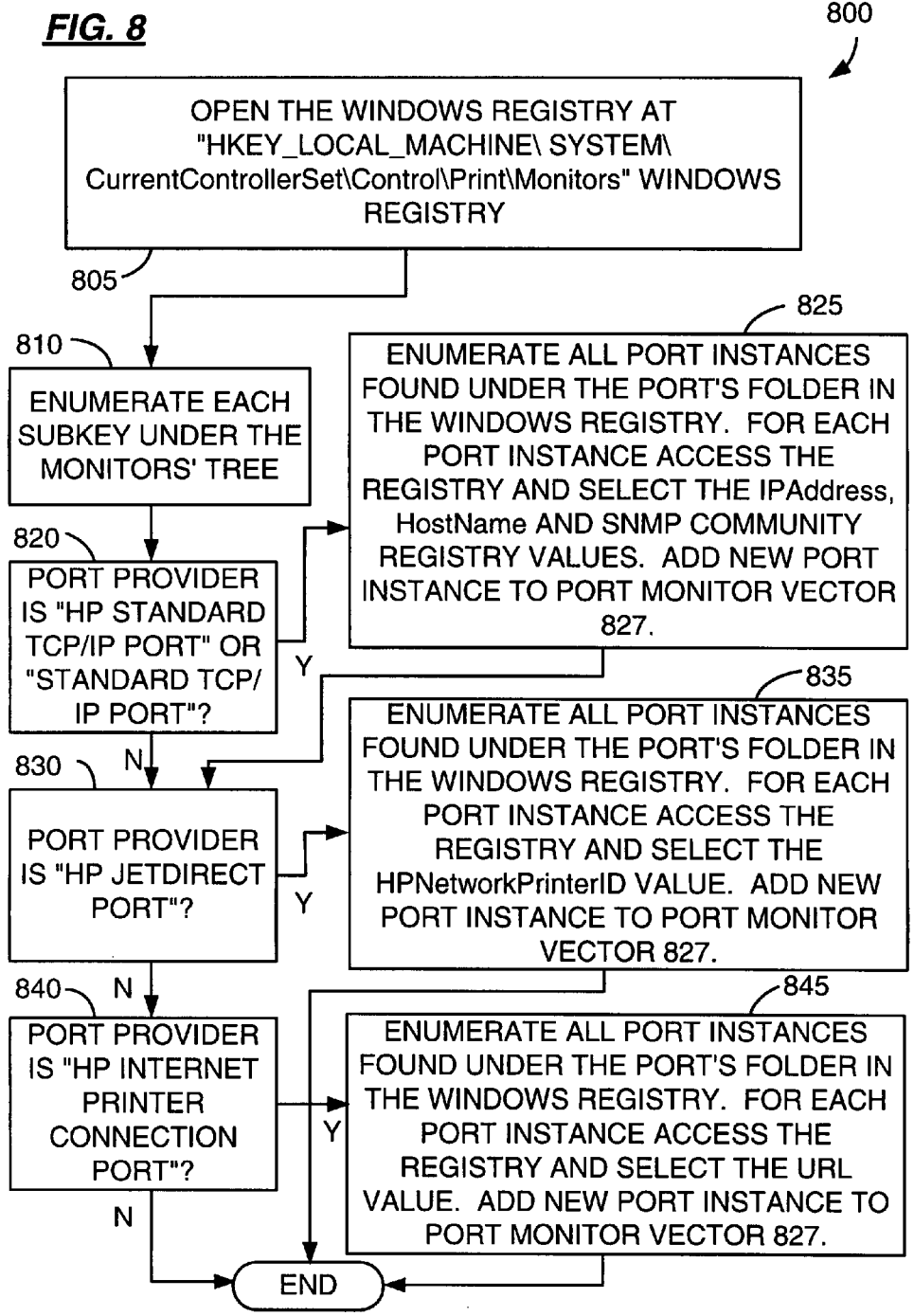
FIG. 8 presents a block diagram of a routine for discovering the IP address of a printer.
Figure 9:
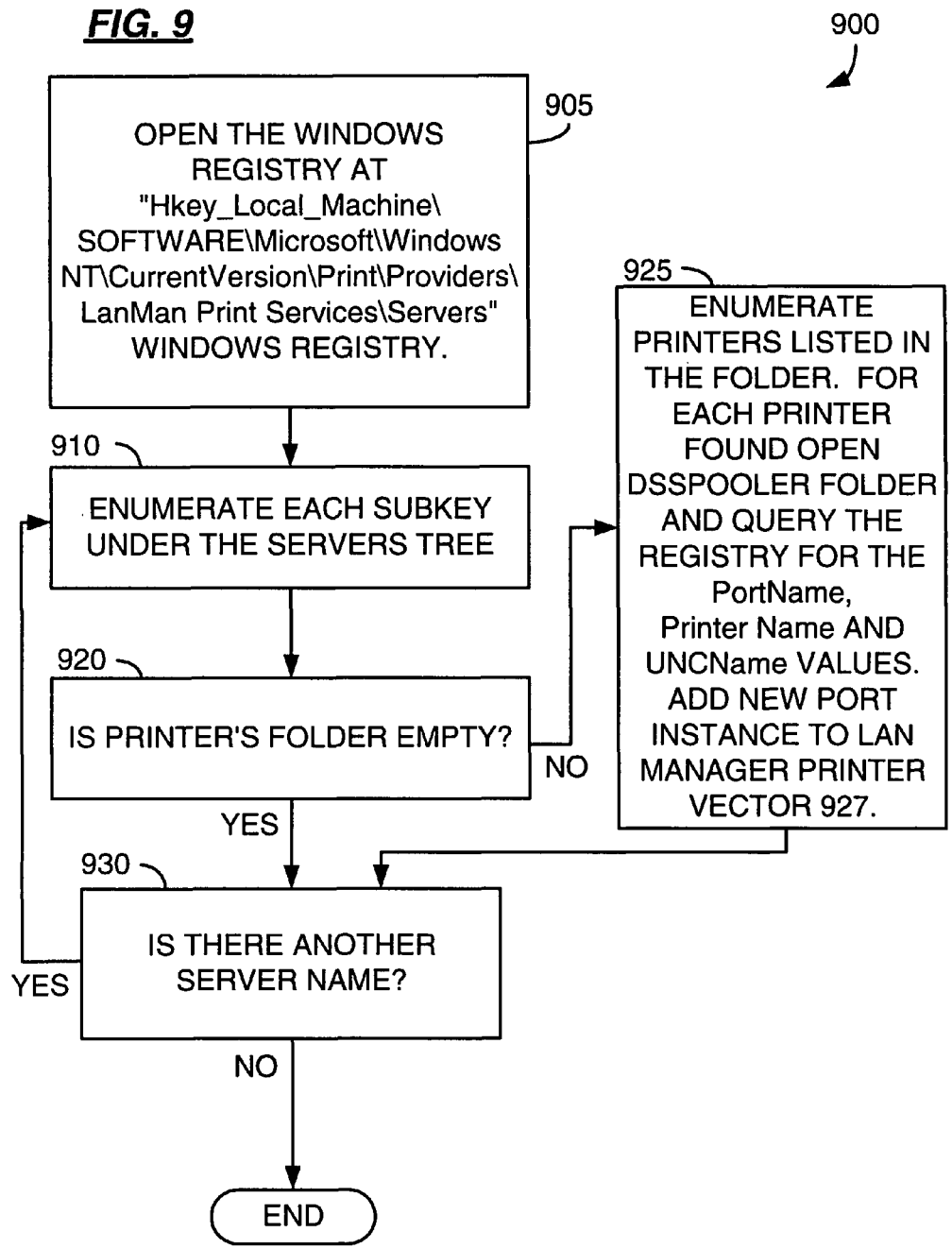
FIG. 9. presents a block diagram of a routine for discovering the IP address of a printer.

Referring now more particularly to the drawings, a routine 800 (FIG. 8) creates the second vector 827, the port monitor vector 827. This routine 800 begins by opening the Windows Registry at location
HKEY_LOCAL_MACHINE\SYSTEM\CurrentControllerSet\Control\Print\Monitors (step 805). Each of the monitors listed are compared against a well-known name that the algorithm recognizes, and each subkey under the monitor's tree is enumerated (step 810). The monitor provider name is then compared against the "HP Standard TCP/IP Port" or the Microsoft's "Standard TCP/IP Port" provider names (step 820). If the name matches, the Port's folder under the key is opened and all the instances of each port are enumerated (step 825). Depending on the installation tool, the port name is created using the printer driver name or other unique name within the Port folder. Each time a new port instance is found during the enumeration, the port information is accessed by querying the registry value. In the case of the Standard TCP/IP Port and the HP Standard TCP/IP Port, the following values are collected: IPAddress, HostName and SNMP Community. The Port name and the collected values are added to the port monitor vector 827. In some cases the IPAddress or the HostName values are left blank by the installation utility.

The monitor provider name is also compared against the "HP JetDirect Port" provider name (step 830). If the name matches, then each port instance found in the Ports folder is enumerated (step 835). Each time a new port instance is found, the port information is accessed by querying the registry for the following value, HPNetworkPrinterID. This value is parsed looking for the following format: TCPIP,<ip value>,<digit>. If the port is indeed a TCP/IP port, then the value following the TCPIP string corresponds to the IP value. If the port is not a TCP/IP port and corresponds to another protocol, the port is skipped. If the IP address is found, it is added to the port monitor vector 827.

The monitor provider name may also be compared against the "HP Internet Printer Connection Port" provider name (step 840). If the name matches, then each port instance found in the Ports folder is enumerated (step 845). Each time a new port instance is found the port information is accessed by querying the registry for value URL. The value is then parsed looking for a syntax <ip>/ipp or for syntax http://<ip>/ipp. If the IP address is available, it is extracted from the string and added to the port monitor vector 827.

With reference to F*ig*.9, a process 900 creates the third vector 927, the LAN Manager printer vector 927, this time by searching through data relating to print servers found under the registry key:

HKEY_LOCAL_MACHINE\SOFTWARE\Microsoft\
  WindowsNT \CurrentVersion\Print\Providers\LanMan
  Print Services\Servers The Windows registry is first opened (step 905), and enumeration of print servers begins, including enumeration of each subkey under the server's tree (step 910). Each new server is accessed, and a Printers folder is opened to see if there are printers installed for that server (step 920). For each new printer found, a DsSpooler folder is opened, and the following values are queried from the registry: PortName, PrinterName, and UNCName (step 925). Each new printer found, after repetition of the process (step 930), is added to the LAN Manager printer vector 927.

Figure 10:
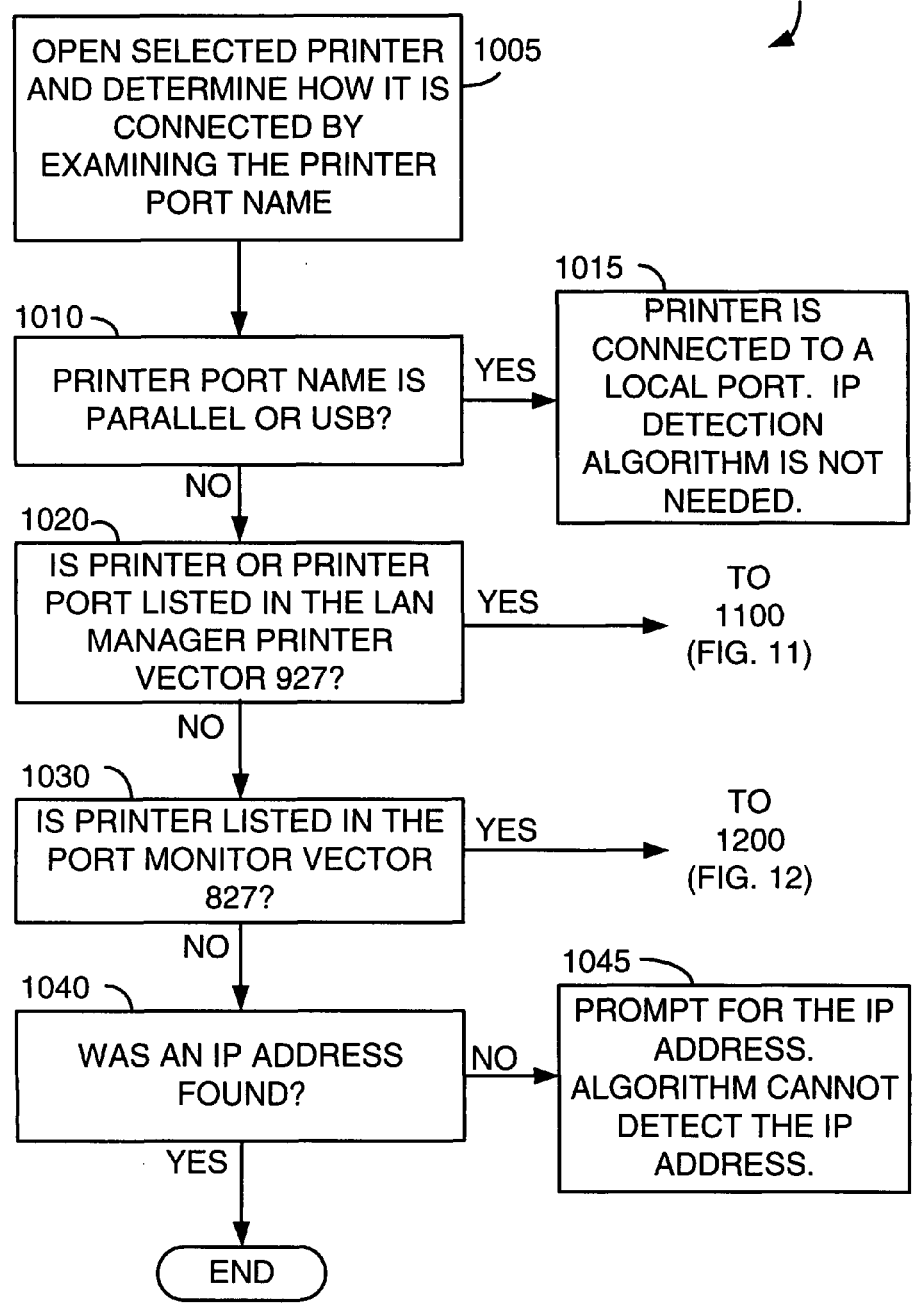
FIG. 10 presents a block diagram of a routine for discovering the IP address of a printer.

Another exemplary process 1000 is depicted in FIG. 10. Process 1000 begins by opening the printer information file and determining how the printer is connected to the PC (step 1005). Again, the three possible options are parallel, USB and Network. The port name is examined to determine if the port is a parallel or USB port (step 1010). If any of those ports are found, then the algorithm terminates (step 1015).

The LAN Manager printer vector 927 (third vector) is taken and examined to see if the printer is listed in the vector 927 (step 1020). If the printer port and printer name are found, the information in the vector 927 is used to resolve the IP address. For example, depicted in F*ig*.11, starting at entry 1100, the port name is retrieved from the vector 927 and is checked to see if it conforms to the UNC standard (\\server\resource) (step 1102). If the port is in UNC form, the resource name is used to query the network DNS using a call to the Winsock library gethostbyname( )(step 1105). If the name is resolved, the IP address is obtained and returned. If it is not resolved, a blank string is returned. If the port name is not in UNC form, the port name is used to call the gethostbyname( )API routine to see if the network DNS knows about this resource (step 1110). In the event that the IP address is not found (step 1120), the domain name server (DNS) is called using the printer's name (step 1125).

Referring again to F*ig*.10, if the printer was not found in the LAN Manager vector 927, then this time the port monitor vector 827 (second vector) is used to look for the printer port (step 1030). If the port name is matched, then the vector 827 information is retrieved to see if the IP address is available. If it is available, then the IP address is returned by the process whose entry point is 1200 as is shown in F*ig*.12. If the IP address is not available (step 1210), then the port host name is used to call the domain name server (DNS) and see if the DNS can resolve the name using the Winsock API gethostbyname( )(step 1220).

Once the above steps have been performed, the algorithm checks to see if the IP address was found (step 1040). If it was not found, the algorithm stops, and the user then is prompted to provide an IP address for the printer (step 1045).

The embodiments of the invention described above describes diagnosing printers and diagnosing, replacing, or upgrading their drivers. Other embodiments can be designed to support other types of peripherals and their drivers, with the peripherals connected to a computer in different ways than those described above. For example, the invention can be applied to peripheral scanners, memories, cameras, displays, microphones, speakers, modems, and other types of peripherals requiring either third party or operating system drivers. As other examples, in addition to parallel ports, USB ports, and Ethernet ports, the invention can apply to peripherals connecting to a computer by means of serial ports, IEEE 1394 ports, wireless (IEEE 802 and Bluetooth, for example) ports, SCSI ports and IDE ports, PCMCIA ports, and to peripherals that plug directly into a system bus, such as an ISA or PCI bus, or to peripherals that connect to cards plugging into these and other comparable busses.

While a preferred embodiment of the invention has been shown, those skilled in the art will recognize that numerous modifications and changes may be made without departing from the true spirit and scope of the invention as defined in the claims annexed to and forming a part of this specification.

APPENDIX A

XML MESSAGE RETURNED BY IADD DATABASE (step 514, Fig. 5)

1.  Data Structure of XML Message

```xml
<?xml version="1.0" encoding="UTF-8"?>
<product basepart="Innn">
        <attribute_file_specification>2.2</attribute_file_specification>
        <attribute_author_email>buid_errors_spo@iadd-server.ipssources.com</attribute_author_email>
        <driver name="XXXX">
                <alias>XXXX</alias>
                ................................
                <alias>XXXX</alias>
                <model>XXXXX</model>
                ................................
                <model>XXXXX</model>
                <lang>LANG_XXXXX</lang>
                ................................
                <lang>LANG_XXXXX</lang>
                <date>mm/dd/yyyy</date>
                <version>X</version>
                <os platform="Windows_XXXXX" name="XXXX">
                        <network_compatible>X</network_compatible>
                        <installation_method>X</installation_method>
                        <primary_inf>X</primary_inf>
                        <storage_format>X</storage_format>
                        <digital_signature>X</digital_signature>
                        <monolithic_install>X</monolithic_install>
                        <additional_install>X</additional_install>
                        <prerequisites>X</prerequisites>
                        <functionality>X</functionality>
                        <improvement>X</improvement>
                        <knownIssues>X</knownIssues>
                        <reserved></reserved>
                </os>
                <os platform="Windows_XXXXX" name="XXXX">
                ......
                </os>
        </driver>
        <driver name="XXXXX">
        .....
        </driver>
</product>
```

2.  Example of an XML Message (Copr. 2002 Hewlett Packard Company)

```xml
<?xml version="1.0" encoding="UTF-8"?>
<product basepart="lj616">
        <attribute_file_specification>2.2</attribute_file_specification>
        <attribute_author_email>build_errors_bpd@iadd-server.ipssources.com</attribute_author_email>
                <driver name=" HP LaserJet 5Si Mopier PS">
                        <alias>HP LaserJet 5Si Mopier PostScript</alias>
                        <alias>HP LaserJet 5Si/5Si Mopier PS</alias>
                        <lang>SUBLANG_CHINESE_TRADITIONAL</lang>
                        <lang>LANG_DANISH</lang>
                        <lang>LANG_DUTCH</lang>
                        <lang>LANG_ENGLISH</lang>
                        <lang>LANG_FRENCH</lang>
                        <lang>LANG_GERMAN</lang>
                        <lang>LANG_HUNGARIAN</lang>
                        <lang>LANG_ITALIAN</lang>
                        <lang>LANG_POLISH</lang>
                        <lang>LANG_PORTUGUESE</lang>
                        <lang>LANG_NORWEGIAN</lang>
                        <lang>LANG_FINNISH</lang>
                        <lang>LANG_SWEDISH</lang>
                        <lang>LANG_TURKISH</lang>
                        <model>HP LaserJet 5</model>
                        <model>HP LaserJet 5M</model>
                        <model>HP LaserJet 5P</model>
                        <model>HP LaserJet 5MP</model>
                        <date>02/01/2001</date>
                        <version>1.0</version>
                        <os platform="Windows_NT_4" name="Windows NT">
                                <network_compatible>1</network_compatible>
                                <installation_method>INF</installation_method>
                                <primary_inf>ntprint.inf</primary_inf>
                                <storage_format>WinZip</storage_format>
                                <digital_signature>0</digital_signature>
                                <prerequisites>0</prerequisites>
                                <reserved1></reserved1>
                        <functionality>This driver supplies all the Mopier printing functionality to Windows NT 4.0</functionality>
                        <improvement>Added support for duplexing and improved paper handling options.</improvement>
                        <knownIssues>None</knownIssues>
                        </os>
                </driver>
                <driver name="HP LaserJet 5Si Mopier PS">
                <lang>SUBLANG_CHINESE_TRADITIONAL</lang>
                <lang>LANG_DANISH</lang>
                <lang>LANG_DUTCH</lang>
                <lang>LANG_ENGLISH</lang>
```

```xml
        <lang>LANG_FRENCH</lang>
        <lang>LANG_GERMAN</lang>
        <lang>LANG_HUNGARIAN</lang>
        <lang>LANG_ITALIAN</lang>
        <lang>LANG_POLISH</lang>
        <lang>LANG_PORTUGUESE</lang>
        <lang>LANG_NORWEGIAN</lang>
        <lang>LANG_FINNISH</lang>
        <lang>LANG_SWEDISH</lang>
        <lang>LANG_TURKISH</lang>
        <model >HP LaserJet 5Si Mopier</model >
        <date>02/01/2001</date>
        <version>1.0</version>
        <os platform="Windows_NT_4" name="Windows NT">
           <network_compatible>1</network_compatible>
           <installation_method>INF</installation_method>
           <primary_inf>ntprint.inf</primary_inf>
           <storage_format>WinZip</storage_format>
           <digital_signature>0</digital_signature>
           <multi_directory>0</multi_directory>
           <prerequisites>0</prerequisites>
           <functionality>This driver supplies all the Mopier printing functionality to Windows NT
           4.0</functionality>
           <improvement>Added support for duplexing and improved paper handling options.
           </improvement>
           <knownIssues>None</knownIssues>
           <reserved1></reserved1>
        </os>
</driver>
</driver name="HP LaserJet 5Si/5Si MX PS">
        <model >HP LaserJet 5Si</model >
        <model >HP LaserJet 5Si MX</model >
        <date>02/01/2001</date>
        <version>1.0</version>
        <os platform="Windows_NT_4" name="Windows NT">
           <network_compatible>1</network_compatible>
           <installation_method>INF</installation_method>
           <primary_inf>ntprint.inf</primary_inf>
           <storage_format>WinZip</storage_format>
           <digital_signature>0</digital_signature>
           <prerequisites>0</prerequisites>
           <functionality>This driver supplies all the Mopier printing functionality to Windows NT
           4.0</functionality>
           <improvement>Added support for duplexing and improved paper handling options.
           </improvement>
           <knownIssues>None</knownIssues>
           <reserved1></reserved1>
        </os>
        <os platform="Windows_2000" name="Windows 2000">
           <network_compatible>1</network_compatible>
           <installation_method>INF</installation_method>
           <primary_inf>ntprint.inf</primary_inf>
```

```
            <storage_format>WinZip</storage_format>
            <digital_signature>1</digital_signature>
            <prerequisites>0</prerequisites>
            <functionality>This driver supplies all the Mopier printing functionality to Windows NT
            4.0</functionality>
            <improvement>Added support for duplexing and improved paper handling options.
            </improvement>
            <knownIssues>None</knownIssues>
            <reserved1></reserved1>
         </os>
     </driver>
</product>
```

3. Tag Definitions in XML Message

*product basepart= <string>*

Purpose: Opening tag for an attribute file. The basepart is essentially a part number for the compressed driver files that are stored on the ftp site. Usually baseparts begin with a two letter identifier like "lj", "dj", "bi", etc. What follows is a 3 or 4 digit number that is arbitrary and not intended to match the product in any way. The basepart provides the key for I-ADD to match up the attribute data to the data stored in the TOAD (or in the future the SOAR) database.

Source: The basepart is allocated by the product division in advance of creating the attribute file. CSSO is the division that gives out the baseparts. Usually the baseparts are assigned by a technical marketing engineer in the product division.

Example: "lj101", "dj989", "bi103"

Status: Required.

*attribute_file_specification <string>*

Purpose: Identifies the XML schema revision. Version 1.0 was the original definition. This document contains version 2.2 with family driver support. This field is intended to help parsers handle differing file versions if necessary. The current value is 2.1.

Source: Dictated by the I-ADD Attribute Specification document (this document).

Example: 2.2

Status: Required.

*attribute_author_email <string>*

Purpose: Identifies the CDP email address for notifying the product divisions of build errors. This will be used to help in resolving problems with attribute files.

Source: The *IADD Driver Attributes schema* document kept under the IAdd Server project in CDP.
Current values are:
build_errors_bpd@iadd-server.ipssources.com
build_errors_pls@iadd-server.ipssources.com build_errors_spo@iadd-server.ipssources.com
build_errors_vcd@iadd-server.ipssources.com Example: build_errors_bpd@iadd-server.ipssources.com Status: Required.
*driver name=<string>*

Purpose: The beginning of a subsection. The *name* attribute on the <driver> tag is the name of the driver as it would appear to the user running the Microsoft Add Printer Wizard (also as listed in the driver inf file if one exists). This string will be available to be presented to the user to choose a driver. In the event of a family driver, multiple <driver> tags can occur. Between the <driver> and </driver> tags goes all the attributes for this driver. Some divisions call this the "friendly name". This value will be used by installers to pick the correct driver out of an inf file. Therefore it is imperative that this string be correct *including case sensitivity.*

Source: Comes from the inf file.

Example: HP LaserJet 4050 Series PCL 5e

Status: Required.

NOTE: Between the <driver> tag and the <os> tag, the order of the following tags must be maintained. So the order must be: <alias>, <lang>, <model>, <date>, and <version> (the *alias* tag can be left out if not needed).

*alias <string>*

Purpose: Provides for the tracking of old names a driver may have been known by. Over time different naming conventions may be adopted. A new release of an existing driver may go by a new name. If a version is part of the driver name then a new alias would be created each time that version number changed. Applications looking for an update to an existing driver will need these values to find the latest driver.

Source: Each time the driver name is changed, the previous name should be added as an alias.
Example: HP LaserJet 4050 Series PCL 6 v1.0

Status: Optional.

*lang <string>*

Purpose: This set of strings represents the languages supported by the driver. Some languages, such as Chinese, also have sub languages associated with them. The legal set of language values is found in Appendix A. The Microsoft language naming convention is being used. These names will be matched up with what is kept in TOAD/SOAR and do not need to match the language strings shown on the Web pages. In the event a sub language is being specified, a value from appendix B should be used.

Source: Dictated by Appendix A and B.
Example: LANG_ENGLISH, LANG_FRENCH, SUBLANG_CHINESE_TRADITIONAL Status: Required.

*model <string>*

Purpose: This is the name of a device model, as returned in the device ID model sub string, that is supported by the driver. Most drivers support more than one device model. This set of <model> tags provides a definitive list of devices supported by this driver. There should be as many <model> tags as there are supported models. This value will be used to lookup matching drivers in the I-ADD backend. Therefore it is imperative that this string be correct *including case sensitivity*.

Source: Comes from the printer firmware. Product divisions should obtain this value from their firmware teams. Tools like the Install Network Printer Wizard will also display this value after the device has been discovered.

Example: DESKJET 990C, HP LaserJet 4050 Series

Status: Required.

*date <mm/dd/yyyy>*

Purpose: A date string that matches the date of one of the data files covered in the source section below. This date will be used by applications looking for a driver update. Due to the inconsistency of the use of dates and versions this evolved as the best scheme for looking for driver updates.

Source: The date comes from one of the following sources depending on the driver type:
PCL monolithic – driver file
PostScript – PPD file
MS unidriver – GPD file
The appropriate data file *MUST* be touched each time the driver is rolled. The date *MUST* be touched each time the driver is rolled.

Example: 01/01/2001

Status: Required.

*version <string>*

Purpose: This attribute will contain the driver's version number. An installer can use this to know whether a driver on the Internet is newer than a driver the user may already have. This version should match the version put in the inf file (if one exists). Any format is supported.

Source: Specified by the product division. Possibly contained in the inf file.

Example: v1.0, 1.0.0.1, A.1.0.1

Status: Required.

*os platform=<string>*

Purpose: Start of a new operating system section. The platform tag represents the operating system value. Some drivers work on multiple operating systems such as Windows 95 and Windows 98 or Windows NT 4.0 and Windows 2000. It is usually not necessary to differentiate between subversions like Windows 2000 and Windows 2000 Professional. Appendix C contains all the legal platform values.

Source: Dictated by Appendix C.

Example: Windows_NT_4, Windows 2000

Status:Required.

NOTE: Only operating systems that share the same basepart should be combined into one attribute file. DO NOT combine operating systems that use different baseparts in one attribute file!

*network_compatible <{0,1}>*

Purpose: This BOOL flag allows calling program to know whether driver is compatible for network use. A value of "0" means not network compatible; a value of "1" means network compatible.

Source: Generally speaking all recent drivers are network compatible. A few older drivers had problems operating on the network and/or they chewed up tremendous network bandwidth and multiple such drivers on a network could severely affect network bandwidth.

Example: 1

Status: Required.

*installation_method <{INF, MONOLITHIC, AUTOSETUP, MANUALSETUP, others...}>*

Purpose: This attribute will provide information about whether the driver is INF installable (Windows *AddPrinter*), a monolithic, or uses some other method (e.g. non-Windows platform specific installation method). The intent is to allow the calling program to determine whether or not it can install the driver in its current configuration.

INF – driver is installed through the inf file (Microsoft *Add Printer* style). The intent behind this value is to indicate whether or not the driver could be successfully installed by an application like the Microsoft *AddPrinter Wizard*. A driver might have an inf file but not be installable by the *Add Printer Wizard*. It might require an HP installer, for example, running as the result of a Plug-in-Play event.

MONOLITHIC – kept for backwards compatibility; means the driver download contains a setup program to run AUTOSETUP – similar to MONOLITHIC; once downloaded and decompressed a setup program will automatically run MANUALSETUP – similar to AUTOSETUP except the user must manually run the setup program after decompression Note: New attribute files should choose between INF, AUTOSETUP, and MANUALSETUP.

Source: The product division should set this value based upon the type of install expected by the driver package on the Web. Note that an AUTOSETUP install might make use of an inf file but the install is automatically launched and handled by a setup program. A value of "inf" would be specified for a package where the files would be downloaded and then a program outside of the package run to read the inf file and make use of it (e.g. Microsoft Add Printer Wizard, HP Install Network Printer Wizard)

Example: INF

Status: Required.

*primary_inf <string>*

Some drivers ship with multiple INF files. This attribute will indicate to the calling program which INF file to use to install the printer driver. The string should contain the primary INF file name (e.g. "hpblaf.inf"). Required if the <installation_method> is "INF".

Source: This is a judgment call by the product division. Generally speaking all recent drivers are network compatible. A few older drivers had problems operating on the network and/or they chewed up tremendous network bandwidth and multiple such drivers on a network could severely affect network bandwidth.

Example: 1

Status: Required if the <installation_method> is "INF".

*monolithic_install <string>*

Indicates the name of the setup or install program that is called to perform all installation steps. The calling program would simple invoke this executable to handle the installation. The string should contain the name of the executable filename that needs to be executed. An example would be "setup.exe". Required if the <installation_method> is "MONOLITHIC", "AUTOSETUP", or "MANUALSETUP".

Source: Generally speaking all recent drivers are network compatible. A few older drivers had problems operating on the network, and several such drivers on a network could severely affect network bandwidth.

Example: 1

Status: Required if the <installation_method> is "MONOLITHIC", "AUTOSETUP", or "MANUALSETUP"..

*storage_format <{WinZip, EXE, Cab, LZ, InfoZip, OCI, others...}>*

This attribute will indicate to the calling program how the driver files were compressed. If the calling program does not have the capability to handle the specified compression format, the calling program shouldn't try to decompress and install the driver. Required.

WinZip – compressed using the Zip format (current LaserJet default)

EXE – compressed into a self-extracting executable

CAB – compressed as a Microsoft CAB file

LZ – compressed in the LZH format

InfoZip – compression format used by the DeskJet drivers

OCI – "One-Click Install"; for ADD wrapped drivers (The ADD (Automatic Driver Download) project involves wrapping zipped executables in an InstallShield "One-Click Install" form.0

Source: Generally speaking all recent drivers are network compatible. A few older drivers had problems operating on the network and/or they chewed up tremendous network bandwidth and multiple such drivers on a network could severely affect network bandwidth.

Example: 1

Status: Required.

*additional_install <string>*

Purpose: This attribute will indicate the executable filename to be called in the event that the driver provides a post-install executable. It would be used in the event that a driver uses an INF or other installation method, but provides additional steps in the form of an executable to be performed afterward.

Source: Specified by the product division.

Example: register.exe

Status: Optional.

*digital_signature <{0, 1}>*

Purpose: This Boolean flag indicates whether or not the driver contains a digital signature. This is need for Windows 2000 installs. If the user has a policy set requiring drivers to have digital signatures then the installer could use this flag to determine if this driver is a candidate.

Source: Specified by the product division.

Example: 1

Status: Required.

*prerequisites <{0,1}>*

Purpose: Used for ADD auto-wrapping with One-Click Install. Indicates whether or not the installation of the driver requires prerequisite steps not handled by the installer. For example, if the user must install a certain version of firmware first or perform other prerequisite steps not covered by the installer then this value should be set to "1". If the installer will cover any prerequisites than this value should be set to "0".

Source: As described above, this should be set if the driver installation requires prerequisite steps not handled by the installer.

Example: 0

Status: Required.

*functionality <string>*

Purpose: This section should contain a brief summary of the major functionality of the driver. Identify the driver as a (vendor name) driver. NOTE: This text should be displayable to customers.

Source: This information typically would match comments placed on the HP driver download web pages or in a readme file packaged with the driver files.

Example: "Version 2.01 offers increased bi-directional support as well as support for Windows 2000."

Status: Required.

*improvement <string>*

This section should contain a brief summary of enhancements over previous versions of the driver. NOTE: This text should be displayable to customers and not contain any company confidential information. This tag would be empty for the first release of a driver.

Source: This information typically would match comments placed on the driver download web pages or in a readme file packaged with the driver files.

Example: "Bi-directional support has been greatly enhanced. Support for duplex printing has been added."

Status: Required.

*knownIssue <string>*

This section should briefly list any known issues still unresolved with this driver. NOTE: This text should be displayable to HP customers and not contain any company confidential information.

Source: This is a judgment call by the product division. Generally speaking all recent drivers are network compatible. A few older drivers had problems operating on the network and/or they chewed up tremendous network bandwidth and multiple such drivers on a network could severely affect network bandwidth.

Example: "Paper jams are not properly reported under Windows 95."

Status: Required.

*reserved1 <field1 value, field2 value, ...>*

Reserved for future use without requiring a specification change. The characters between the tags should not extend beyond 256 characters.

Source: Generally speaking all recent drivers are network compatible. A few older drivers had problems operating on the network and/or they chewed up tremendous network bandwidth and multiple such drivers on a network could severely affect network bandwidth.
Example: None
Status: Required.

APPENDIX B

USB PORT PRINTER MONITOR ENUMERATION ROUTINE (STEP 204 IN FIG. 2)

```
//----------Copr. 2001 Hewlett Packard Company---------------------------------------------
// Description:
//              Accesses the registry to create a vector with the USB port monitors that are installed
//              on the computer. The vector is stored in the class data member: m_USBPortVector.
//              The m_USBPortVector is cleared before the registry is accessed.
//Arguments:
//              NONE
// Example:
// Return Value:
//              NONE
//-----------------------------------------------------------------------------------
void PrinterUtilities::GetUSBPortMonitors()
{
        const int cBufferSize = 1024;    // Arbitrary initial value.
    HKEY        hKey, hSubKey, hInnerSubKey;
        TCHAR   szBuffer[cBufferSize];
        DWORD   nSubKeySize = cBufferSize;
        DWORDnInnerKeySize = cBufferSize;
        DWORDdwInnerBufLen = cBufferSize;
        CHAR    szSubKeyName[cBufferSize];
        CHAR    szInnerSubKeyName[cBufferSize];
        CHAR    szParentIDPrefix[cBufferSize];
        CHAR    szClass[cBufferSize];
        CHAR    szSubKeyPath[cBufferSize];
        FILETIME lastUpdate, innerLastUpdate;
    DWORD       dwBufLen = cBufferSize;
    LONG        lRet;
        USBPort *pUSBPort;
        TraceODS (LEVEL_REGULAR, TRACE_INFO, _T("PrinterUtilities::GetUSBPortMonitors"),
                        0L, _T("START:PrinterUtilities::GetUSBPortMonitors"));
        // Clear the vector
        m_USBPortVector.clear();
        // Access the registry and look for the MS Standard port monitors
        _tcscpy(szBuffer, "SYSTEM\\CurrentControlSet\\Enum\\USB");
        if(RegOpenKeyEx(HKEY_LOCAL_MACHINE,
                TEXT(szBuffer),
                0, KEY_ENUMERATE_SUB_KEYS | KEY_READ, &hKey) !=ERROR_SUCCESS)
                return;
        // Now enumerate all the keys that are listed in the USB port or the
        int nIndex = 0;
        do
```

```
            {
                    nSubKeySize = cBufferSize;
// Initialize the buffer before trying to enumerate
                    dwBufLen = cBufferSize;
// rest the buffer every time
                    lRet = RegEnumKeyEx(hKey, nIndex, szSubKeyName,
                            &nSubKeySize, NULL, NULL, NULL, &lastUpdate);
                    if (lRet == ERROR_SUCCESS)
                    {
                            _stprintf(szSubKeyPath, "%s\\%s", szBuffer, szSubKeyName);
                            // Get the PnP ID
                            if(RegOpenKeyEx(HKEY_LOCAL_MACHINE,
                            TEXT(szSubKeyPath),
                            0, KEY_ENUMERATE_SUB_KEYS | KEY_READ, &hSubKey) !=
ERROR_SUCCESS)
                            {
                                    RegCloseKey(hKey);
                                    continue;
                            }
                            nInnerKeySize = cBufferSize;
                            dwInnerBufLen = cBufferSize;
                            szInnerSubKeyName[0] = '\0';
                            lRet = RegEnumKeyEx(hSubKey,
                                    0,
                                    szInnerSubKeyName,
                                    &dwInnerBufLen, NULL, NULL, NULL,
                                    &innerLastUpdate);
                            if (lRet == ERROR_SUCCESS)
                            {
                                    dwBufLen = cBufferSize;
                                    // Get the PnP ID
                                    _stprintf(szSubKeyPath, "%s\\%s", szSubKeyPath,
szInnerSubKeyName);

if(RegOpenKeyEx(HKEY_LOCAL_MACHINE,
                                    TEXT(szSubKeyPath),
                                    0, KEY_QUERY_VALUE, &hInnerSubKey)== ERROR_SUCCESS)
                                    {
                                    // Don't check for the return code. If the key is not there it is blank
                                    szParentIDPrefix[0] = '\0';
                                    RegQueryValueEx(hInnerSubKey,
                                            TEXT("ParentIdPrefix"),
                                            NULL,
                                            NULL,
                                            (LPBYTE)szParentIDPrefix,
                                            &dwBufLen);
                                    dwBufLen = cBufferSize;
                                    // Don't check for the return code. If the key is not there it is blank
                                    szClass[0] = '\0';
                                    RegQueryValueEx(hInnerSubKey,
                                            TEXT("Class"),
                                            NULL,
```

```
                        NULL,
                        (LPBYTE)szClass,
                        &dwBufLen);
                        RegCloseKey(hInnerSubKey);
                }
                RegCloseKey(hSubKey);
                // Add the port
                pUSBPort = new USBPort();
                // create a new instance of USB Port
                        pUSBPort->szUSBPortMonitorName = szSubKeyName;
                        pUSBPort->szPortID = szInnerSubKeyName;
                        pUSBPort->szParentIdPrefix = szParentIDPrefix;
                        pUSBPort->szClass = szClass;
                        m_USBPortVector.push_back(pUSBPort);
            }
            // Increment the index
            nIndex++;
        }
    } while (lRet == ERROR_SUCCESS);
    RegCloseKey(hKey);
}//GetUSBPortMonitors
```

What is claimed is:

1. An automated method of detecting the internet protocol (IP) address of a network printer that is in communication with a computer having a registry, and of using that internet protocol (IP) address to test the printer, comprising the following steps performed by a printer test program running on the computer:

generating a list of printers and a list of port monitors that the computer's registry indicates have been installed on the computer, the list of installed printers including said network printer;

using the computer's registry, generating at least one vector based on said installed port monitors;

determining if the computer communicates print jobs to said network printer peer-to-peer or via a print server;

wherein, if the computer communicates with said network printer peer-to peer, said method comprises retrieving the internet protocol (IP) address of the network printer by retrieving that address directly from the vector, and if the computer communicates with said network printer via a print server, retrieving the internet protocol (IP) address of the network printer by requesting the internet protocol (IP) address from a domain name server; and using the retrieved internet protocol (IP) address to test the printer, bypassing any printer driver software.

2. The method of claim 1,
wherein the vector based on the installed port monitors includes, when available, any IP address, URL address, or port host name associated with the network printer, its port, and its port monitor.

3. The method of claim 1, further comprising:
generating a local area network (LAN) manager vector including, when available, any port name, printer name, or universal naming convention (UNC) name associated with the network printer; and
using said LAN manager vector in requesting the internet protocol (IP) address from the domain name server.

4. The method of claim 1, further comprising:
in the retrieving step, submitting to the domain name server a port name obtained from the computer's registry data associated with the network printer.

5. The method of claim 1, further comprising:
in the retrieving step, submitting to the domain name server a printer name obtained from the computer's registry data associated with the network printer.

6. The method of claim 1, further comprising:
in the retrieving step, submitting to the domain name server a resource portion of a UNC name obtained from the computer's registry data associated with the network printer.

7. The method of claim 1, further comprising:
in the retrieving step, retrieving the network printer's internet protocol (IP) address using the computer's registry data associated with the network printer, its port, and its port monitor.

8. The method of claim 1, further comprising:
in the retrieving step, submitting to the domain name server a UNC address obtained from the computer's registry data associated with the network printer, its port, and its port monitor.

9. The method of claim 1, further comprising:
in the retrieving step, submitting to the domain name server a port host name obtained from the computer's registry data associated with the network printer, its port, and its port monitor.

10. An apparatus for testing whether a network printer is operating and can communicate with a computer having a registry, the testing procedure bypassing any printer driver software, the apparatus comprising:

a processing unit;

a memory coupled to the processing unit;

a network interface for connecting via a network to the network printer;

a program stored in the memory which, when executed by the processing unit, performs:

generating a list of printers and a list of port monitors that the computer's registry indicates have been installed on the computer, the list of installed printers including said network printer;

using the computer's registry, generating at least one vector based on said installed port monitors;

determining if the computer communicates print jobs to said network printer peer-to-peer or via a print server;

wherein, if the computer communicates with said network printer peer-to peer, said method comprises retrieving the internet protocol (IP) address of the network printer by retrieving that address directly from the vector, and if the computer communicates with said network printer via a print server, retrieving the internet protocol (IP) address of the network printer by requesting the internet protocol (IP) address from a domain name server; and using the retrieved internet protocol (IP) address to test the printer, bypassing any printer driver software.

11. The apparatus of claim 10,
wherein the vector based on the installed port monitors includes, when available, any IP address, URL address, or port host name associated with the network printer, its port, and its port monitor.

12. The apparatus of claim 10, further comprising:
generating a local area network (LAN) manager vector including, when available, any port name, printer name, or universal naming convention (UNC) name associated with the network printer; and
using said LAN manager vector in requesting the internet protocol (IP) address from the domain name server.

13. The apparatus of claim 10, further comprising:
in the retrieving step, submitting to the domain name server a port name obtained from the computer's registry data associated with the network printer.

14. The apparatus of claim 10, further comprising:
in the retrieving step, submitting to the domain name server a printer name obtained from the computer's registry data associated with the network printer.

15. The apparatus of claim 10, further comprising:
in the retrieving step, submitting to the domain name server a resource portion of a UNC name obtained from the computer's registry data associated with the network printer.

16. The apparatus of claim 10, further comprising:
in the retrieving step, retrieving the network printer's internet protocol (IP) address using the computer's registry data associated with the network printer, its port, and its port monitor.

17. The apparatus of claim 10, further comprising:
in the retrieving step, submitting to the domain name server a UNC address obtained from the computer's registry data associated with the network printer, its port, and its port monitor.

18. The apparatus of claim 1, further comprising:
in the retrieving step, submitting to the domain name server a port host name obtained from the computer's registry data associated with the network printer, its port, and its port monitor.

* * * * *

UNITED STATES PATENT AND TRADEMARK OFFICE
CERTIFICATE OF CORRECTION

| | | |
|---|---|---|
| PATENT NO. | : 8,488,143 B2 | Page 1 of 1 |
| APPLICATION NO. | : 10/377438 | |
| DATED | : July 16, 2013 | |
| INVENTOR(S) | : Lozano et al. | |

It is certified that error appears in the above-identified patent and that said Letters Patent is hereby corrected as shown below:

In the Claims

Column 44, line 62, in Claim 18, delete "claim 1," and insert -- claim 10, --, therefor.

Signed and Sealed this
Fourth Day of March, 2014

Michelle K. Lee
*Deputy Director of the United States Patent and Trademark Office*